(12) United States Patent
Khan et al.

(10) Patent No.: US 12,497,704 B1
(45) Date of Patent: Dec. 16, 2025

(54) 3D-TRIPTYCENE BASED MICROPOROUS POLYMER AS ELECTROCATALYST FOR HYDROGEN EVOLUTION REACTION

(71) Applicant: King Fahd University of Petroleum and Minerals, Dhahran (SA)

(72) Inventors: Abuzar Khan, Dhahran (SA); Mosim Ansari, Dhahran (SA); Mohd Yusuf Khan, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 19/247,722

(22) Filed: Jun. 24, 2025

(51) Int. Cl.
*C25B 11/085* (2021.01)
*C08G 16/02* (2006.01)
(Continued)

(52) U.S. Cl.
CPC .......... *C25B 11/085* (2021.01); *C08G 16/025* (2013.01); *C08G 16/0268* (2013.01);
(Continued)

(58) Field of Classification Search
CPC ......... C25B 11/085; C25B 1/04; C25B 11/06; C08G 16/025; C08G 16/0268; C08G 16/0275; C08L 65/00
See application file for complete search history.

(56) References Cited

U.S. PATENT DOCUMENTS

| | | | |
|---|---|---|---|
| 12,351,465 B1 * | 7/2025 | Makhseed | C01B 32/70 |
| 2005/0211978 A1 * | 9/2005 | Bu | G11C 13/0014 257/40 |
| 2020/0346185 A1 * | 11/2020 | Al Hamouz | B01J 20/3085 |

FOREIGN PATENT DOCUMENTS

| | | |
|---|---|---|
| CN | 112646131 B | 11/2021 |
| CN | 110090633 B | 2/2022 |

(Continued)

OTHER PUBLICATIONS

Ansari—2025 ("Nitrogen and sulfur-enriched 3D-Triptycene based microporous polymer as efficient electrocatalyst for alkaline hydrogen evolution reaction," Int. J. Hydrogen Energy 2025, 141, 870-878). (Year: 2025).*

(Continued)

*Primary Examiner* — James Lin
*Assistant Examiner* — Kevin Sylvester
(74) *Attorney, Agent, or Firm* — Oblon, McClelland, Maier & Neustadt, L.L.P.

(57) ABSTRACT

An electrocatalyst includes a substrate and a microporous polymer on the substrate. The microporous polymer includes, in polymerized form, a triptycene of Formula (I)

(Continued)

and a phenothiazine of Formula (II)

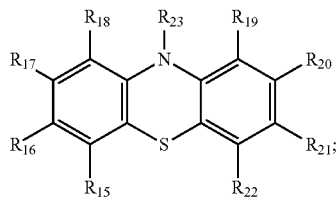

where in Formula (I), $R_{1-14}$ each individually represent hydrogen, an optionally substituted alkyl, an optionally substituted aryl, with at least two representing hydrogen and in Formula (II), $R_{15-23}$ each individually represent hydrogen, an optionally substituted alkyl. The triptycene of Formula (I) and the phenothiazine of Formula (II) are linked by methylene units.

20 Claims, 16 Drawing Sheets

(51) Int. Cl.
*C08L 65/00* (2006.01)
*C25B 1/04* (2021.01)
*C25B 11/061* (2021.01)

(52) U.S. Cl.
CPC .......... *C08G 16/0275* (2013.01); *C08L 65/00* (2013.01); *C25B 1/04* (2013.01); *C25B 11/061* (2021.01)

(56) References Cited

FOREIGN PATENT DOCUMENTS

| CN | 117443408 A | 1/2024 |
|---|---|---|
| CN | 118930860 A | 11/2024 |

OTHER PUBLICATIONS

Ito et al. ("High Catalytic Activity of Nitrogen and Sulfur co-Doped Nanoporous Graphene in Hydrogen Evolution Reaction," Angew. Chem. Int. Ed. 2015, 54, 2131-2136). (Year: 2015).*

Elewa et al. ("Triptycene-based discontinuously-conjugated covalent organic polymer photocatalysts for visible-light driven hydrogen evolution from water," Appl. Catal., B 2021, 285, article 119802, p. 1-12). (Year: 2021).*

He et al. ("Efficient adsorption of methyl orange and methyl blue dyes by a novel triptycene-based hyper-crosslinked porous polymer," RSC Adv. 2022, 12, 5587-5594). (Year: 2022).*

Yan et al. ("Novel phenothiazine-based hyper-cross-linked porous polymers containing N, S double electrically rich atoms for efficient iodine capture," Microporous Mesoporous Mater. 2022, 343, article 112157, p. 1-8). (Year: 2022).*

Ansari—2024 ("Thermally Stable and High-Surface-Area Triptycene and Phenanthroline-Based Microporous Polymer for Selective CO2 Capture over CH4 and N2," Acs Appl. Polym. Mater. 2024, 6, 3996-4004). (Year: 2024).*

Zhang et al. ("Triptycene-Based Hyper-Cross-Linked Polymer Sponge for Gas Storage and Water Treatment," Macromolecules 2015, 48, 8509-8514). (Year: 2015).*

Juxin Li, et al., "Novel triptycene-based microporous polymers decorated with Cd0.52n0.5S quantum dots to form 0D/3D heterofunction for efficient photocatalytic hydrogen evolution", International Journal of Hydrogen Energy, vol. 45, Issue 36. Jul. 31, 2020, pp. 18985-18994. 4 Pages.

Delie Gligor, et al., "Photoelectrocatalytic oxidation of NADH at a graphite electrode modified with a new polymeric phenothiazine", Electroanalysis, vol. 21, Issus 3-5, Feb. 2009, pp. 360-367, 8 Pages.

* cited by examiner

3D-TRIPTYCENE BASED MICROPOROUS POLYMER AS ELECTROCATALYST FOR HYDROGEN EVOLUTION REACTION

STATEMENT OF PRIOR DISCLOSURE BY AN INVENTOR

Aspects of the present disclosure are described in Mosim Ansari, Mohd. Yusuf Khan, Mohammad Furquan, Abduljamiu Amao, Firoz Khan, Abuzar Khan, "Nitrogen and sulfur-enriched 3D-Triptycene based microporous polymer as efficient electrocatalyst for alkaline hydrogen evolution reaction," International Journal of Hydrogen Energy, Vol. 141, pages 870-878, June 2025 which is incorporated herein by reference in its entirety.

STATEMENT OF ACKNOWLEDGEMENT

Support provided by the Interdisciplinary Research Center for Hydrogen and Energy Storage (IRC-HES) under project INHT2402 at the King Fahd University of Petroleum and Minerals (KFUPM), Dhahran, Saudi Arabia is gratefully acknowledged.

BACKGROUND

Technical Field

The present disclosure generally relates to electrocatalysis and polymer chemistry. More particularly, the present disclosure pertains to electrocatalysts including microporous polymers formed from triptycene and phenothiazine monomers and methods of synthesizing and fabricating the electrocatalysts on conductive substrates, and subsequent application in electrochemical hydrogen evolution reactions (HER).

Description of Related Art

The "background" description provided herein is for the purpose of generally presenting the context of the disclosure. The work of the presently named inventors, to the extent it is described in this background section, as well as aspects of the description which may not otherwise qualify as prior art at the time of filing, are neither expressly nor impliedly admitted as prior art against the present invention.

Hydrogen is regarded as a cornerstone for clean and sustainable energy systems due to high gravimetric energy density and zero-emission characteristics of hydrogen upon combustion or electrochemical conversion. Despite a considerable potential of hydrogen to decarbonize various industrial and transportation sectors, large-scale adoption of hydrogen energy remains hindered by the inefficiency and environmental cost of prevailing production methods.

Presently, a most common method of hydrogen production is steam methane reforming (SMR), which is industrially mature; however, it suffers from low conversion efficiency and substantial carbon dioxide emissions [See: Hanan A, Lakhan M N, Solangi M Y, AlSalhi M S, Kumar V, Devanesan S, et al. *MXene based electrocatalyst: $CoS_2@Ti_3C_2Tx$ composite for hydrogen evolution reaction in alkaline media Mater Today Sustain* 2023; 24:100585, and Aftab U, Solangi M Y, Tahira A, Hanan A, Abro M I, Karsy A, and researchers. *An advanced PdNPs@MoS_2 nanocomposite for efficient oxygen evolution reaction in alkaline media RSC Adv* 2023; 13:32413-23]. In response, electrochemical water splitting has emerged as a promising carbon-neutral alternative, capable of generating hydrogen using renewable electricity and producing only oxygen as a byproduct [See: Hanan A, Solangi M Y, Jaleel laghari A, Shah A A, Aftab U, Ibupoto Z A, et al. $PdO@CoSe_2$ *composites: efficient electrocatalysts for water oxidation in alkaline media RSC Adv* 2023; 13:743-55].

Central to the effectiveness of water electrolysis is the performance of the hydrogen evolution reaction (HER) electrocatalyst. Highly efficient electrocatalysts for HER, such as platinum (Pt), ruthenium (Ru), and iridium (Ir), are widely acknowledged for low overpotentials and excellent catalytic activity. However, limited availability and high cost of the aforementioned metals impose severe constraints on scalability for commercial hydrogen production. Consequently, significant research efforts have been directed toward the development of platinum-group-metal (PGM)-free alternatives, including transition metal carbides, sulphides, and selenides. While (PGM)-free alternative materials offer cost advantages, many suffer from suboptimal catalytic activity, higher overpotentials, and poor long-term electrochemical stability under alkaline conditions.

Covalent organic frameworks (COFs) and covalent organic polymers (COPs) may be candidates for next-generation HER electrocatalysts. COFs and COPs are built upon rigid covalent linkages and exhibit high thermal and chemical stability, large surface area, and tune-able porosity, rendering them as ideal platforms for tailoring active sites through chemical modification. Such polymeric frameworks have also been employed as precursors for heteroatom-doped carbon electrocatalysts, where the incorporation of heteroatoms such as nitrogen and sulfur modulates the local electronic environment, enhances charge transfer, and introduces catalytically active sites capable of promoting water dissociation and hydrogen adsorption [See: Luo Z, Liu S, Cai Y, Li S, Pan A, Liang S. *Nitrogen/sulfur co-doped hollow carbon nanofiber anode obtained from polypyrrole with enhanced electrochemical performance for Na-ion batteries Sci Bull (Beijing)* 2018; 63:126-32 and Xin G, Wang M, Zhang W, Song J, Zhang B. *Preparation of high-capacitance N, S co-doped carbon nanospheres with hierarchical pores as supercapacitors Electrochim Acta* 2018; 291:168-76].

Despite the aforementioned advances, the catalytic performance of such doped carbon materials is influenced significantly by the nature and distribution of heteroatoms, the microstructure of the carbon matrix, and the fabrication methodology employed. Achieving uniform dispersion of active species, preserving porosity during processing, and ensuring adequate electrical connectivity with the underlying substrate remain persistent challenges in the field. In order to address the above listed limitations, conductive substrates such as nickel foam (NF) have been explored for use in HER electrodes due to excellent conductivity, three-dimensional porous architecture, and chemical stability in alkaline media. NF offers superior reactant diffusion and active site accessibility, thereby facilitating enhanced electrocatalytic performance. Moreover, the integration of doped carbon-based materials with NF substrates using solution-based deposition techniques followed by thermal treatment has gained. Further, advanced post-treatment techniques such as laser-assisted annealing have emerged as desirable tools for modulating the structural and electronic properties of carbon-based electrodes [See: Bhalothia D, Hsiung W—H, Yang S-S, Yan C, Chen P—C, Lin T-H, and coworkers. *Sub-millisecond laser annealing induced surface and subsurface restructuring of cu-ni-pd trimetallic nanocatalyst promotes thermal $CO_2$ reduction ACS Appl Energy*

*Mater* 2021; 4:14043-58]. Laser annealing provides rapid, localized heating that may induce defect formation, improve graphitization, and improve heteroatom distribution, ultimately contributing to improved electrocatalytic activity and stability. Compared to conventional pyrolysis or furnace-based annealing, laser-based methods are energy-efficient, time-effective, and compatible with large-scale processing requirements.

In view of the aforementioned shortcomings, there remains a pressing requirement for electrocatalyst systems that may combine a molecularly engineered polymeric framework with tailored heteroatom functionalities, integration onto conductive substrates, and post-treatment processes capable of enhancing the active surface characteristics without compromising structural integrity or reproducibility. Accordingly, one object of the present disclosure is to provide an electrocatalyst and a method of forming thereof, in conjunction with a method of electrochemically forming hydrogen gas by a hydrogen evolution reaction, that may circumvent the above specified drawbacks and limitation of the methods known in the art.

SUMMARY

In an exemplary embodiment, an electrocatalyst is described. The electrocatalyst includes a substrate, and a microporous polymer disposed on the substrate. The microporous polymer includes, in polymerized form a triptycene of Formula (I)

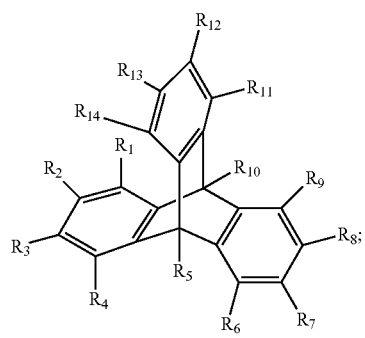

(I)

and a phenothiazine of Formula (II)

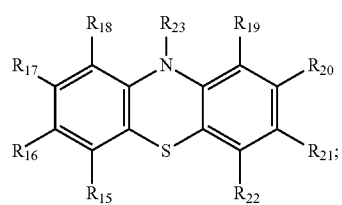

(II)

where in Formula (I), $R_{1-14}$ each individually represent hydrogen, an optionally substituted alkyl, an optionally substituted aryl, or an optionally substituted alkaryl, with at least two representing hydrogen and in Formula (II), $R_{15-23}$ each individually represent hydrogen, an optionally substituted alkyl, an optionally substituted aryl, or an optionally substituted alkaryl, with at least two of $R_{15}$-$R_{22}$ representing hydrogen. The triptycene of Formula (I) and the phenothiazine of Formula (II) are linked by methylene units.

In some embodiments, the triptycene of Formula (I) is triptycene.

In some embodiments, the phenothiazine of Formula (II) is phenothiazine.

In some embodiments, each triptycene of Formula (I) is connected to from 2 to 6 phenothiazines of Formula (II).

In some embodiments, the electrocatalyst includes structural units of Formula (III):

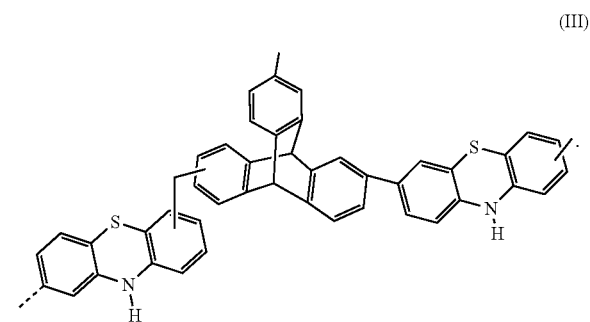

(III)

In some embodiments, the microporous polymer is amorphous by powder X-ray diffraction (PXRD) spectroscopy.

In some embodiments, the electrocatalyst has a mass loading of 1 to 25 mg the microporous polymer per $cm^2$ of substrate.

In some embodiments, the electrocatalyst further includes carbon nanosheets disposed on the porous polymer, where the carbon nanosheets are amorphous by XRD.

In some embodiments, the substrate is nickel foam.

In another exemplary embodiment, a method of forming the electrocatalyst is described. The method includes suspending the microporous polymer in an alcohol having 1 to 5 carbon atoms to form a deposition solution, depositing the porous polymer on the substrate by drop-casting the deposition solution to form a coated electrode, and drying the coated electrode to form the electrocatalyst.

In some embodiments, the method of forming the electrocatalyst further includes forming the microporous polymer by heating a reaction mixture including the triptycene of Formula (I), the phenothiazine of Formula (II), a methylene-containing crosslinking agent, and a Lewis acid catalyst in an organic solvent to 50 to 100° C. to form the microporous polymer.

In some embodiments, the triptycene of Formula (I) is triptycene.

In some embodiments, the phenothiazine of Formula (II) is phenothiazine.

In some embodiments, the methylene-containing crosslinking agent is dimethoxymethane.

In some embodiments, the Lewis acid catalyst is $FeCl_3$.

In some embodiments, the method further includes, prior to the drying, irradiating the coated electrode with a laser having a wavelength of 10.6 μm and a maximum power of 5 watts (W) to 50 W.

In yet another exemplary embodiment, a method of electrochemically forming hydrogen gas by a hydrogen evolution reaction. The method includes contacting the electrocatalyst with an aqueous electrolyte solution including a hydroxide base, and applying a potential of −0.75 to 0.10 V to the electrocatalyst and a counter electrode immersed in the aqueous electrolyte solution.

In some embodiments, the electrocatalyst has a hydrogen evolution reaction onset potential of −0.25 to −0.01 V relative to the reversible hydrogen electrode.

In some embodiments, the electrocatalyst has an overpotential required to generate a current density of 10 mAcm$^{-2}$ ($\eta 10$) of 50 to 150 mV relative to the reversible hydrogen electrode and the electrocatalyst has a Tafel slope of 25 to 150 mV dec$^{-1}$.

In some embodiments, the hydroxide base is 1.0 M KOH.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1A:
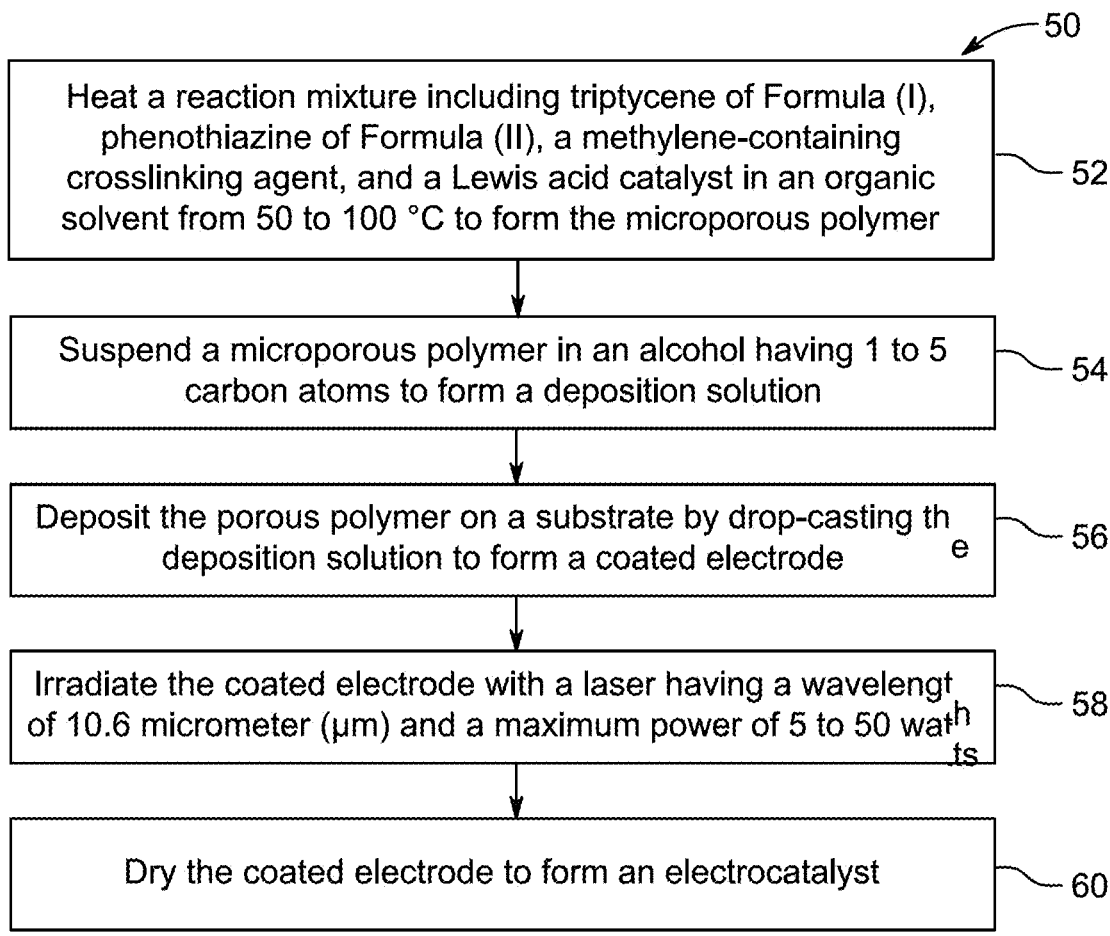
FIG. 1A illustrates a method flow chart for forming an electrocatalyst, according to certain embodiments.

When describing the present disclosure, the terms used are to be construed in accordance with the following definitions, unless a context dictates otherwise.

Embodiments of the present invention will now be described more fully hereinafter with reference to the accompanying drawings wherever applicable, in that some, but not all, embodiments of the disclosure are shown.

In the drawings, reference numerals designate identical or corresponding parts throughout several views. Further, as used herein, the words 'a', 'an' and the like generally carry a meaning of 'one or more,' unless stated otherwise.

Furthermore, the terms 'approximately', 'approximate', 'about', and similar terms generally refer to ranges that include the identified value within a margin of 20%, 10%, or preferably 5%, and any values therebetween.

The present disclosure will be better understood with reference to the following definitions. As used herein, the words 'a' and 'an' and the like carry the meaning of 'one or more.' Within the description of this disclosure, where a numerical limit or range is stated, the endpoints are included unless stated otherwise. It will be further understood that the terms 'includes' and/or 'including,' when used in this specification, specify the presence of stated features, integers, steps, operations, elements, and/or components, but do not preclude the presence or addition of one or more other features, integers, steps, operations, elements, components, and/or groups thereof.

As used herein, the words 'about,' 'approximately,' or 'substantially similar' may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), +/−15% of the stated value (or range of values), or +/−20% of the stated value (or range of values). Within the description of this disclosure, where a numerical limit or range is stated, the endpoints are included unless stated otherwise. Also, all values and subranges within a numerical limit or range are specifically included as if explicitly written out.

The present disclosure is intended to include all hydration states of a given compound or formula, unless otherwise noted or when heating a material.

In addition, the present disclosure is intended to include all isotopes of atoms occurring in the present compounds and complexes. Isotopes include those atoms having the same atomic number but different mass numbers. By way of general example, and without limitation, isotopes of hydrogen include deuterium and tritium. Isotopically labelled compounds of the disclosure may generally be prepared by conventional techniques known to those skilled in the art or by processes analogous to those described herein, using an appropriate isotopically labelled reagent in place of the non-labelled reagent otherwise employed.

The phrase 'substantially free', unless otherwise specified, describes a particular component being present in an amount of less than about 1 wt. %, preferably less than about 0.5 wt. %, more preferably less than about 0.1 wt. %, even more preferably less than about 0.05 wt. %, yet even more preferably 0 wt. %, relative to a total weight of the composition being discussed. As used herein, the terms 'optional' or 'optionally' means that the subsequently described event(s) can or cannot occur or the subsequently described component(s) may or may not be present (e.g., 0 wt. %).

As used herein, the term 'halogen atom' refers to the atom of the group in the periodic table consisting of six chemically related elements: fluorine (F), chlorine (Cl), bromine (Br), or iodine (I).

As used herein, the term 'substituted' refers to at least one hydrogen atom that is replaced with a non-hydrogen group, provided that normal valencies are maintained and that the substitution results in a stable compound. When a group is noted as 'optionally substituted', the group may or may not contain non-hydrogen substituents. When present, the substituent(s) may be selected from alkyl, halo (e.g., chloro, bromo, iodo, fluoro), hydroxyl, alkoxy, oxo, alkanoyl, aryloxy, alkanoyloxy, amino (—$NH_2$), alkylamino (—NHalkyl), cycloalkylamino (—NHcycloalkyl), arylamino (—NHaryl), arylalkylamino (—NHarylalkyl), disubstituted amino (e.g., in which the two amino substituents are selected from alkyl, aryl or arylalkyl, including substituted variants thereof, with specific mention being made to dimethylamino), alkanoylamino, aroylamino, arylalkanoylamino, thiol, alkylthio, arylthio, arylalkylthio, alkylthiono, arylthiono, arylalkylthiono, alkylsulfonyl, arylsulfonyl, arylalkylsulfonyl, sulfonamide (e.g., —$SO_2NH_2$), substituted sulfonamide (e.g., —$SO_2$NHalkyl, —$SO_2$NHaryl, —$SO_2$NHarylalkyl, or cases where there are two substituents on one nitrogen selected from alkyl, aryl, or alkylalkyl), nitro, cyano, carboxy, unsubstituted amide (i.e. —$CONH_2$), substituted amide (e.g., —CONHalkyl, —CONHaryl, —CONHarylalkyl or cases where there are two substituents on one nitrogen selected from alkyl, aryl, or alkylalkyl), alkoxycarbonyl, aryl, guanidine, heterocyclyl (e.g., pyridyl, furyl, morpholinyl, pyrrolidinyl, piperazinyl, indolyl, imidazolyl, thienyl, thiazolyl, pyrrolidyl, pyrimidyl, piperidinyl, homopiperazinyl), and mixtures thereof. The substituents may themselves be optionally substituted and may be either unprotected, or protected as necessary, as known to those skilled in the art.

The term 'alkyl,' by itself or as part of another substituent, means, unless otherwise stated, a straight (i.e., unbranched) or branched carbon chain (or carbon), or combination thereof, which may be fully saturated, mono- or polyunsaturated and can include mono-, di- and multivalent radicals. The alkyl may include a designated number of carbons (e.g., $C_1$-$C_{10}$ means one to ten carbons). In embodiments, the alkyl is fully saturated. In embodiments, the alkyl is monounsaturated. In embodiments, the alkyl is polyunsaturated. Alkyl is an uncyclized chain. Examples of saturated hydrocarbon radicals include but are not limited to, groups such as methyl, ethyl, n-propyl, isopropyl, n-butyl, t-butyl, isobutyl, sec-butyl, methyl, homologs, and isomers of, for example, n-pentyl, n-hexyl, n-heptyl, n-octyl, and so on. An unsaturated alkyl group is one having one or more double bonds or triple bonds. Examples of unsaturated alkyl groups include, but are not limited to, vinyl, 2-propenyl, crotyl, 2-isopentenyl, 2-(butadienyl), 2,4-pentadienyl, 3-(1,4-pentadienyl), ethynyl, 1- and 3-propynyl, 3-butynyl, and the higher homologs and isomers.

As used herein, the term 'optionally substituted alkyl' refers to the alkyl group which is substituted with one, two, or three substituents independently selected from hydroxyl, alkoxy, carboxy, cyano, alkoxycarbonyl, alkylthio, alkylsulfonyl, halo, haloalkoxy, —CONRR' or —NRR' (where each R is hydrogen, alkyl, hydroxyalkyl, or alkoxyalkyl, and each R' is hydrogen, alkyl, or cycloalkyl) optionally substituted with one or two groups independently selected from alkyl, hydroxyl, alkoxy, alkylsulfonyl, halo, or —CONRR' where R and R' are as defined above.

As used herein, the term 'optionally substituted aryl' refers to an aryl group that may be substituted with one, two, or more substituents independently selected from alkyl, halo (e.g., chloro, bromo, iodo, fluoro), hydroxyl, alkoxy, oxo, nitro, cyano, carboxy, alkylthio, alkylsulfonyl, arylthio, arylsulfonyl, amino, alkylamino, arylamino, and mixtures thereof. The substituents may themselves be optionally substituted and may be either unprotected or protected as needed, as known to those skilled in the art.

The term 'optionally substituted alkaryl' refers to an alkyl group attached to an aryl group, which may be substituted with one, two, or more substituents independently selected from alkyl, halo (e.g., chloro, bromo, iodo, fluoro), hydroxyl, alkoxy, oxo, nitro, cyano, carboxy, alkylthio, alkylsulfonyl, arylthio, arylsulfonyl, amino, alkylamino, arylamino, and mixtures thereof. The substituents may themselves be optionally substituted and may be either unprotected or protected as needed, as known to those skilled in the art.

As used herein, the term 'compound' refers to a chemical entity, regardless of its phase-solid, liquid, or gaseous—as well as its state-crude mixture, purified, or isolated.

The term 'tautomer' refers to constitutional isomers of organic compounds that readily convert by tautomerization or tautomerism. The interconversion commonly results in the formal migration of a hydrogen atom or proton, accompanied by a switch of a single bond and an adjacent double bond. Tautomerism is a special case of structural isomerism, and because of the rapid interconversion, tautomers are generally considered to be the same chemical compound. In solutions in which tautomerization is possible, a chemical equilibrium of the tautomers will be reached. The exact ratio of the tautomers depends on several factors, including, but not limited to, temperature, solvent, and pH. Exemplary common tautomeric pairs include, but are not limited to, ketone and enol, enamine and imine, ketene and ynol, nitroso and oxime, amide and imidic acid, lactam and lactim (an amide and imidic tautomerism in heterocyclic rings), and open-chain and cyclic forms of an acetal or hemiacetal (e.g., in reducing sugars).

The term 'stereoisomer' refers to isomeric molecules that have the same molecular formula and sequence of bonded atoms (i.e. constitution) but differ in the three-dimensional orientations of their atoms in space. This contrasts with structural isomers, which share the same molecular formula, but the bond connection of their order differs. Molecules that are stereoisomers of each other represent the same structural isomer. Enantiomers are two stereoisomers that are related to each other by reflection, they are non-superimposable mirror images. Every stereogenic center in one has the opposite configuration in the other. Two compounds that are enantiomers of each other have the same physical properties, except for the direction in which they rotate polarized light and how they interact with different optical isomers of other compounds. Diastereomers are stereoisomers not related through a reflection operation; they are not mirror images of each other. These include meso compounds, cis- and trans- (E- and Z—) isomers, and non-enantiomeric optical isomers. Diastereomers seldom have the same physical properties. In terms of the present disclosure, stereoisomers may refer to enantiomers, diastereomers, or both.

Conformers, rotamers, or conformational isomerism refers to a form of isomerism that describes the phenomenon of molecules with the same structural formula but with different shapes due to rotations around one or more bonds. Different conformations can have different energies, can usually interconvert, and are very rarely isolatable. There are some molecules that can be isolated in several conformations. Atropisomers are stereoisomers resulting from hindered rotation about single bonds where the steric strain barrier to rotation is high enough to allow for the isolation of the conformers. In terms of the present disclosure, stereoisomers may refer to conformers, atropisomers, or both.

As used herein, the term 'electrocatalyst' refers to a material that facilitates the acceleration of an electrochemical reaction by providing a surface for the reaction to occur more efficiently, without being consumed in the process.

The term 'substrate' refers to the surface or material upon which a reaction or process occurs. In the context of electrocatalysis, it typically refers to the material on which the electrocatalyst is deposited or supported.

As used herein, 'triptycene' refers to a bicyclic compound consisting of three fused benzene rings, characterized by its rigid and stable aromatic structure.

The term 'phenothiazine' refers to a heterocyclic compound containing a sulfur atom and a nitrogen atom within a ring structure, typically bonded to aromatic groups.

As used herein, the term 'microporous polymer' refers to a polymer material that contains microscopic pores, typically with pore sizes in the range of 0.2 to 2 nanometers. These materials are characterized by their high surface area and ability to adsorb or interact with small molecules, which can influence their properties and applications.

As used herein, the term 'Lewis acid catalyst' refers to a substance that can accept an electron pair from a donor molecule to facilitate a chemical reaction. Lewis acid catalysts typically function by activating substrates for reactions such as nucleophilic attack or electrophilic addition.

The term 'methylene-containing crosslinking agent' refers to a chemical compound that contains methylene groups and can form covalent bonds between polymer chains, thereby crosslinking them. This process typically results in the creation of a three-dimensional network structure, which can alter the physical properties of the polymer.

As used herein, the term 'organic solvent' refers to a liquid that is capable of dissolving or dispersing organic compounds, typically non-polar or slightly polar substances. Organic solvents are used to dissolve or dilute materials to enable chemical reactions or processes to occur.

As used herein, the term 'hydrogen evolution reaction (HER)' refers to the electrochemical process in which hydrogen gas is generated from protons ($H^+$) in an aqueous solution, typically at the cathode of an electrochemical cell. The reaction involves the transfer of electrons and protons to produce hydrogen gas.

As used herein, the term 'reversible hydrogen electrode' (RHE) refers to an electrode that serves as a reference electrode in electrochemical measurements, where its potential is defined relative to the standard hydrogen electrode (SHE).

As used herein, the term 'current density' refers to the amount of electric current traveling per unit cross-sectional area.

As used herein, the term 'Tafel slope' refers to the relationship between the overpotential and the logarithmic current density.

As used herein, the term 'polymer' refers to a large molecule composed of repeating structural units, typically derived from monomers, which are covalently bonded in a chain-like structure and may exhibit unique physical and chemical properties depending on their composition and architecture.

Aspects of the present disclosure are directed to electrocatalysts for efficient and sustainable hydrogen production, a key process for renewable energy conversion and storage. The present disclosure provides a microporous polymer-based electrocatalyst that exhibits strong hydrogen evolution reaction (HER) activity in alkaline solutions. The electrocatalyst demonstrates superior catalytic performance with enhanced efficiency, stability, and durability. This makes it a promising material for applications in water electrolyzers, fuel cells, and other renewable energy technologies.

An electrocatalyst of the present disclosure includes a substrate. The substrate may be made from materials such as copper, aluminum, nickel, iron, and steel. In an embodiment, the steel substrate may include but are not limited to, stainless steel, crucible steel, carbon steel, spring steel, alloy steel, maraging steel, weathering steel, tool steel, or any combination thereof. In some embodiments, the substrate is a steel substrate, preferably a steel mesh substrate. The steel mesh substrate may act as a current collector. In some embodiments, the current collector may be metallic. In some embodiments, the current collector may be ferrite. In another embodiment, the substrate may be a transparent substrate. The transparent substrate may be a glass substrate. The glass substrate may include a fluorine doped tin oxide (FTO) coated glass substrate, a tin doped indium oxide (ITO) coated glass substrate, an aluminum doped zinc oxide (AZO) coated glass substrate, a niobium doped titanium dioxide (NTO) coated glass substrate, an indium doped cadmium oxide (ICO) coated glass substrate, an indium doped zinc oxide (IZO) coated glass substrate, a fluorine doped zinc oxide (FZO) coated glass substrate, a gallium doped zinc oxide (GZO) coated glass substrate, an antimony doped tin oxide (ATO) coated glass substrate, a phosphorus doped tin oxide (PTO) coated glass substrate, a zinc antimonate coated glass substrate, a zinc oxide coated glass substrate, a ruthenium oxide coated glass substrate, a rhenium oxide coated glass substrate, a silver oxide coated glass substrate, and a nickel oxide coated glass substrate. In some embodiments, elements such as Ni, Al, Cu, Fe, Ag, Zn, Sn, Sb, Ti, In, V, Cr, Co, C, Ca, Mo, Au, P, W, Rh, Mn, B, Si Ge, Se, Ln, Ga, Ir, and an alloy or a mixture of two or more of the substance, may be disposed on the surface of the transparent substrate. In a preferred embodiment, the substrate is nickel foam.

The electrocatalyst includes a microporous polymer disposed on the substrate. In an embodiment, the substrate may be deposited partially or wholly with at least one layer of the microporous polymer uniformly and continuously. In some embodiments, the microporous polymer may form a continuous layer on the substrate. In an embodiment, the microporous polymer may form a monolayer on the substrate. In another embodiment, the microporous polymer may include more than a single layer on the substrate. The microporous polymer is amorphous by powder X-ray diffraction (PXRD). Carbon nanosheets are disposed on the microporous polymer. The carbon nanosheets are amorphous by XRD. The microporous polymer and carbon nanosheets may also exist in crystalline, polycrystalline, semi-crystalline, amorphous-crystalline blend forms. Amorphous materials provide advantages such as improved solubility, enhanced processability, and increased flexibility due to their lack of regular structure. These materials are easily moulded, dissolved, and handled.

In some embodiments, the carbon nanosheets may also exit in forms such as carbon nanorods, carbon nanospheres, carbon nanowires, carbon nanocrystals, carbon nanorectangles, carbon nanotriangles, carbon nanopentagons, carbon nanohexagons, carbon nanoprisms, carbon nanodisks, carbon nanocubes, carbon nanoribbons, carbon nanoblocks, carbon nanobeads, carbon nanotoroids, carbon nanodiscs, carbon nanobarrels, carbon nanogranules, carbon nanowhiskers, carbon nanoflakes, carbon nanofoils, carbon nanopowders, carbon nanoboxes, carbon nanostars, carbon tetrapods, carbon nanobelts, carbon nano-urchins, carbon nanoflowers, etc. and mixtures thereof.

The microporous polymer includes, in polymerized form, a triptycene of Formula (I)

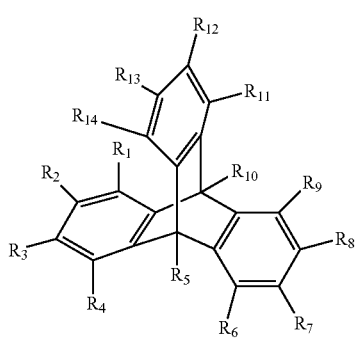

and a phenothiazine of Formula (II)

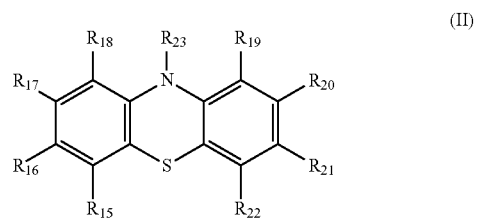

Where, in Formula (I), $R_{1-14}$ each individually represent hydrogen, an optionally substituted alkyl, an optionally substituted aryl, or an optionally substituted alkaryl, with at least two representing hydrogen. In Formula (II), $R_{15-23}$ each individually represent hydrogen, an optionally substituted alkyl, an optionally substituted aryl, or an optionally substituted alkaryl, with at least two of $R_{15}$-$R_{22}$ representing hydrogen. In some embodiments, the triptycene of Formula (I) and the phenothiazine of Formula (II) are linked by methylene units. In some embodiment, the triptycene of Formula (I) is triptycene. In some embodiment, the phenothiazine of Formula (II) is phenothiazine. Each triptycene of Formula (I) is connected to from 2 to 6 phenothiazines of Formula (II).

The electrocatalyst includes structural units of Formula (III):

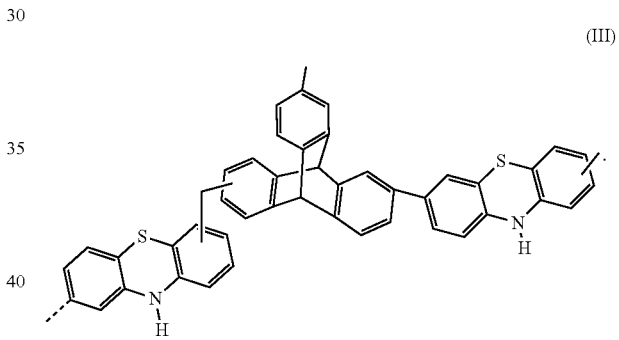

The electrocatalyst has a mass loading of 1 to 25 milligrams (mg) of the microporous polymer per $cm^2$ of substrate, preferably 1 to 15 mg, preferably 3 to 13 mg, preferably 4 to 12 mg, preferably 5 to 11 mg, preferably 6 to 10 mg, preferably 7 to 9 mg, preferably 8 to 8.5 mg, 5 to 15 mg, preferably 6 to 14 mg, preferably 7 to 13 mg, preferably 8 to 12 mg, preferably 9 to 11 mg, preferably 9.5 to 10.5 mg, preferably 9.8 to 10.2 mg, preferably 9.9 to 10.1 mg, preferably 9.95 to 10.05 mg, preferably 10 mg the microporous polymer per $cm^2$ of substrate.

FIG. 1A illustrates a flow chart of a method 50 of forming the electrocatalyst. The order in which the method 50 is described is not intended to be construed as a limitation, and any number of the described method steps can be combined in any order to implement the method 50. Additionally, individual steps may be removed or skipped from the method 50 without departing from the spirit and scope of the present disclosure.

At step 52, the method 50 includes forming the microporous polymer by heating a reaction mixture including the triptycene of Formula (I), the phenothiazine of Formula (II), a methylene-containing crosslinking agent, and a Lewis acid catalyst in an organic solvent to 50 to 100° C., preferably 52 to 98° C., preferably 55 to 95° C., preferably 58 to 92° C., preferably 60 to 90° C., preferably 62 to 88° C., preferably 64 to 86° C., preferably 66 to 84° C., preferably 68 to 82° C., preferably 70 to 80° C., preferably 72 to 78° C., preferably 74 to 77° C., preferably 75 to 77° C., preferably 75.5 to 76.5° C., preferably 76 to 77° C., preferably 76.2 to 76.8° C., preferably 76.4 to 76.6° C., preferably 76.5° C. to form the microporous polymer. Examples of methylene-containing crosslinking agents may include dimethoxymethane, divinylbenzene, and ethylene glycol dimethyl ether. In a preferred embodiment, the methylene-containing crosslinking agent is dimethoxymethane. The Lewis acid may include, but is not limited to, aluminum chloride, boron trifluoride, titanium tetrachloride, zinc chloride, tin (ii) chloride, copper (ii) chloride, chromium (iii) chloride, nickel (ii) chloride, antimony pentafluoride, titanium isopropoxide, gallium chloride, zirconium tetrachloride. In a preferred embodiment, the Lewis acid catalyst is $FeCl_3$. In some embodiments, the organic solvent may include, but is not limited to, tetrahydrofuran, ethyl acetate, dimethylformamide, acetonitrile, acetone, dichloromethane, toluene, dimethyl sulfoxide, nitromethane, propylene carbonate, ethanol, formic acid, n-butanol, methanol, or any combination thereof. In a preferred embodiment, the organic solvent is anhydrous 1,2-dichloroethane.

At step 54, the method 50 includes suspending the microporous polymer in an alcohol having 1 to 5 carbon atoms to form a deposition solution. Stirring, sonication, vortex mixing, ball milling, high-speed homogenization, magnetic stirring, ultrasonic dispersion, mechanical agitation, and shear mixing methods may be used for suspending the microporous polymer in the alcohol. In a preferred embodiment, the microporous polymer is suspended in the alcohol having 1 to 5 carbon atoms is done ultrasonically. The alcohol may include, but is not limited to, methanol, ethanol, propanol, isopropanol, butanol, isobutanol, sec-butanol, tert-butanol, neopentanol, pentanol, 2-methylpropanol, 3-methylbutanol, 2,3-dimethylbutanol, 2-ethylbutanol, isoamyl alcohol, 3-ethyl-1-butanol, 1-methylpropanol, 1,2-Butanediol, 1,3-Propanediol. In a preferred embodiment, the alcohol is ethanol.

At step 56, the method 50 includes depositing the porous polymer on the substrate by drop-casting the deposition solution to form a coated electrode. In some embodiments, the porous polymer may be deposited on the surface of the coated electrode using one of the techniques such as physical vapor deposition (PVD), chemical vapor deposition (CVD), spin coating, dip coating, electrophoretic deposition (EPD), Langmuir Blodgett (LB) technique, drop casting, sol-gel process, layer-by-layer (LbL) assembly, inkjet printing, spray coating, and ultrasonic spray deposition.

At step 58, the method 50 includes irradiating the coated electrode with a laser having a wavelength of 10.6 micrometers (μm) and a maximum power of 5 to 50 watts (W), preferably 20 to 40 W, preferably 22 to 38 W, preferably 18 to 32 W, preferably 25 to 35 W, preferably 26 to 34 W, preferably 27 to 33 W, preferably 28 to 32 W, or 23 to 37 W, preferably 24 to 36 W, preferably 22 to 34 W, preferably 23 to 33 W, or 24 to 32 W, preferably 25 to 31 W, preferably 28 to 32 W, preferably 29 to 31 W, or 26 to 34 W, preferably 27 to 33 W, preferably 29 to 31 W, preferably 29.5 to 30.5 W, preferably 30 W. Types of lasers that may be used for irradiating the coated electrode may include, but are not limited to, helium-neon lasers, argon lasers, krypton lasers, xenon ion lasers, nitrogen lasers, carbon dioxide ($CO_2$) lasers, carbon monoxide lasers, excimer lasers, hydrogen fluoride lasers, deuterium fluoride lasers, chemical oxygen-iodine lasers, all gas-phase iodine lasers, dye lasers, ruby laser, yttrium-aluminum-garnet (YAG) lasers (e.g. YAG and any of Nd, Cr, Er, Y, Ca, glass, Th, Yb, Ho). In a preferred embodiment, the laser is a $CO_2$ laser.

At step 60, the method 50 includes drying the coated electrode to form the electrocatalyst. In some embodiments, the drying can be done by oven drying, vacuum drying, infrared drying, freeze drying, hot plate drying, air drying, microwave drying, spray drying, rotary evaporation, desiccator drying. In some embodiments, the drying may be performed by using heating appliances such as ovens, microwaves, autoclaves, hot plates, heating mantles and tapes, oil baths, salt baths, sand baths, air baths, hot-tube furnaces, and hot-air guns. In a preferred embodiment, the drying is done by a vacuum oven.

Figure 1B:
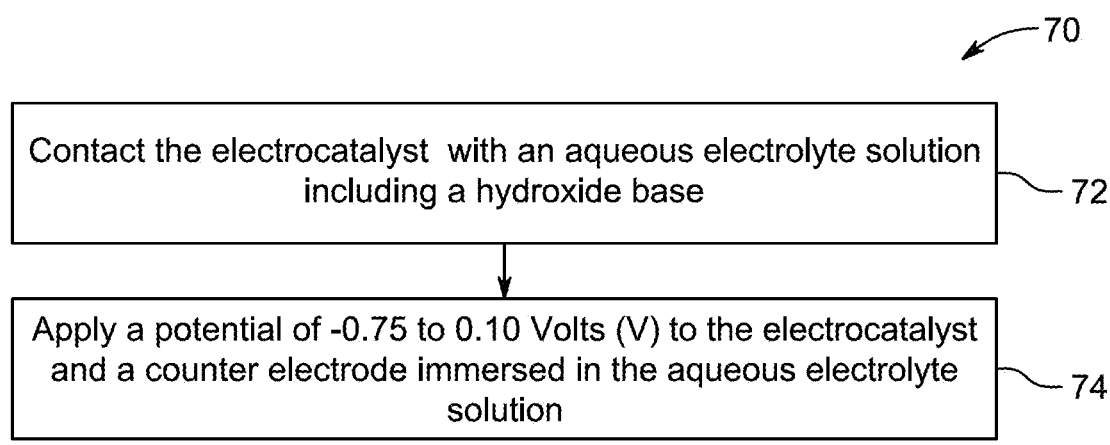
FIG. 1B illustrates a method flow chart for electrochemically forming hydrogen gas by a hydrogen evolution reaction, according to certain embodiments.

FIG. 1B illustrates a schematic flow chart of a method 70 of electrochemically forming hydrogen gas by a hydrogen evolution reaction. The order in which the method 70 is described is not intended to be construed as a limitation, and any number of the described method steps can be combined in any order to implement the method 70. Additionally, individual steps may be removed or skipped from the method 70 without departing from the spirit and scope of the present disclosure.

At step 72, the method 70 includes contacting the electrocatalyst with an aqueous electrolyte solution including a hydroxide base. The aqueous electrolyte solution includes water and the hydroxide base. The hydroxide base may include alkaline earth metal hydroxide such as beryllium hydroxide ($Be(OH)_2$), magnesium hydroxide ($Mg(OH)_2$), strontium hydroxide ($Sr(OH)_2$), and calcium hydroxide ($Ca(OH)_2$) and an alkali metal hydroxide such as lithium hydroxide (LiOH), sodium hydroxide (NaOH), potassium hydroxide (KOH) and rubidium hydroxide (RbOH), and cesium hydroxide (CsOH). In a preferred embodiment, the base is potassium hydroxide (KOH). In a preferred embodiment, the hydroxide base is 1.0 molar (M) KOH.

At step 74, method 70 includes applying a potential of –0.75 to 0.10 volts (V) to the electrocatalyst and a counter electrode immersed in the aqueous electrolyte solution. The counter electrode refers to the electrode used in an electrochemical cell for voltametric analysis or other reactions in which an electric current is expected to flow. The outer surface of the counter electrode may include an inert, electrically conducting chemical substance, such as platinum, gold, or carbon. Carbon may be in the form of graphite or glassy carbon. The counter electrode is a platinum rod. In one embodiment, the counter electrode may be a wire, a rod, a cylinder, a tube, a scroll, a sheet, a piece of foil, a woven mesh, a perforated sheet, or a brush. The counter electrode material should thus be sufficiently inert to withstand the chemical conditions in the electrolyte solution, such as acidic or basic pH values, without substantially degrading during the electrochemical reaction. In addition, the counter electrode should preferably not leach out any chemical substance that interferes with the electrochemical reaction or might lead to undesirable electrode contamination.

One of the parameters used to evaluate the kinetics of the reaction is the Tafel slope. The slope of the Tafel curve represents the Tafel slope, which is related to the activation energy of the reaction. Therefore, the slope indicates the reaction rate. The steeper the slope, the higher the activation energy required for the reaction to occur, and the slower the reaction rate. The electrocatalyst has a Tafel slope of 25 to 150 millivolts per decade (mV $dec^{-1}$), preferably 30 to 120 mV $dec^{-1}$, preferably 35 to 100 mV $dec^{-1}$, preferably 40 to 90 mV $dec^{-1}$, preferably 44 to 80 mV $dec^{-1}$, preferably 46 to 75 mV $dec^{-1}$, preferably 47 to 72 mV $dec^{-1}$, preferably 47.5 to 70 mV dec$^{-1}$, preferably 47.8 to 68 mV dec$^{-1}$, preferably 48 to 66 mV dec$^{-1}$, preferably 48.1 mV dec$^{-1}$. Overpotential in electrolysis refers to the extra energy required than thermodynamically expected to drive a reaction. To make the process commercially viable, it is important to reduce the overpotential losses during the electrolysis of water and improve upon the exchange current density, which measures the reaction rate at the equilibrium potential. The electrocatalyst of the present disclosure produces hydrogen. In a specific embodiment, the electrocatalyst has an overpotential required to generate a current density of 10 milliamperes per square centimeter (mAcm$^{-2}$) ($\eta$10) of 50 to 150 mV, 50 to 150 millivolts (mV), preferably 60 to 140 mV, preferably 70 to 130 mV, preferably 80 to 125 mV, preferably 90 to 120 mV, preferably 100 to 115 mV, preferably 105 to 112 mV, preferably 107 to 111 mV, preferably 108 to 110.5 mV, preferably 109 to 110.2 mV, preferably 109.5 to 110.1 mV, preferably 110 mV relative to the reversible hydrogen electrode.

The electrocatalyst has a hydrogen evolution reaction onset potential of −0.25 to −0.01 V relative to the reversible hydrogen electrode.

EXAMPLES

The following examples demonstrate an electrocatalyst, a method of forming thereof and a method of electrochemically forming hydrogen gas by a hydrogen evolution reaction. The examples are provided solely for illustration and are not to be construed as limitations of the present disclosure, as many variations thereof are possible without departing from the spirit and scope of the present disclosure.

Example 1: Materials and Methods

All analytical-grade chemicals were obtained and used as received. Phenothiazine (98%), triptycene (98%), dimethoxymethane (99%), and anhydrous FeCl$_3$ (99.99%) were obtained from Sigma-Aldrich. Anhydrous dichloroethane (DCE) (99.8%), methanol (99.6%), acetone (99.5%) and tetrahydrofuran (THF, 99.9%). NF of 95% porosity and an average specific surface area of 5400 m2/m3 was purchased from Goodfellow Cambridge Ltd. All studies used deionized filtered water (resistivity 18.2 M) using a Millipore reverse osmosis water system.

Example 2: Synthesis of Nitrogen and Sulfur-Containing Triptycene-Phenothiazine Based Microporous Polymer (NS-TMP)

In a three-neck round bottom flask of a volume of about 100 mL, triptycene (254 mg, 1 mmol), phenothiazine (597 mg, 3 mmol), dimethoxymethane (348 µL, 3 mmol), and anhydrous FeCl$_3$ (648 mg, 4 mmol) were taken subsequently, anhydrous 1,2-Dichloroethane (DCE) (30 mL) was added and refluxed for 24 hours at constant stirring under an inert N$_2$ atmosphere. Further, the resulting solid thus formed was subjected to filtration and washed with dichloromethane (DCM), distilled water, methanol, tetrahydrofuran (THF), and acetone. MeOH was used for a further 24 hours to purify the solid polymer using the Soxhlet apparatus. The resulting solid powder was then heated to 110° C. inside a vacuum oven for 24 hours, yielding the desired polymer NS-TMP (brown solid). Yield: 92%; FT-IR: 3411 (—NH), 3009, 2961, 2914 (—CH—), (Ar—C═C—, 1696-1456), 1378, 1266, 1223, 1182, 1093, 890, 824, 740, 687, 627 cm$^{-1}$.

Figure 1C:
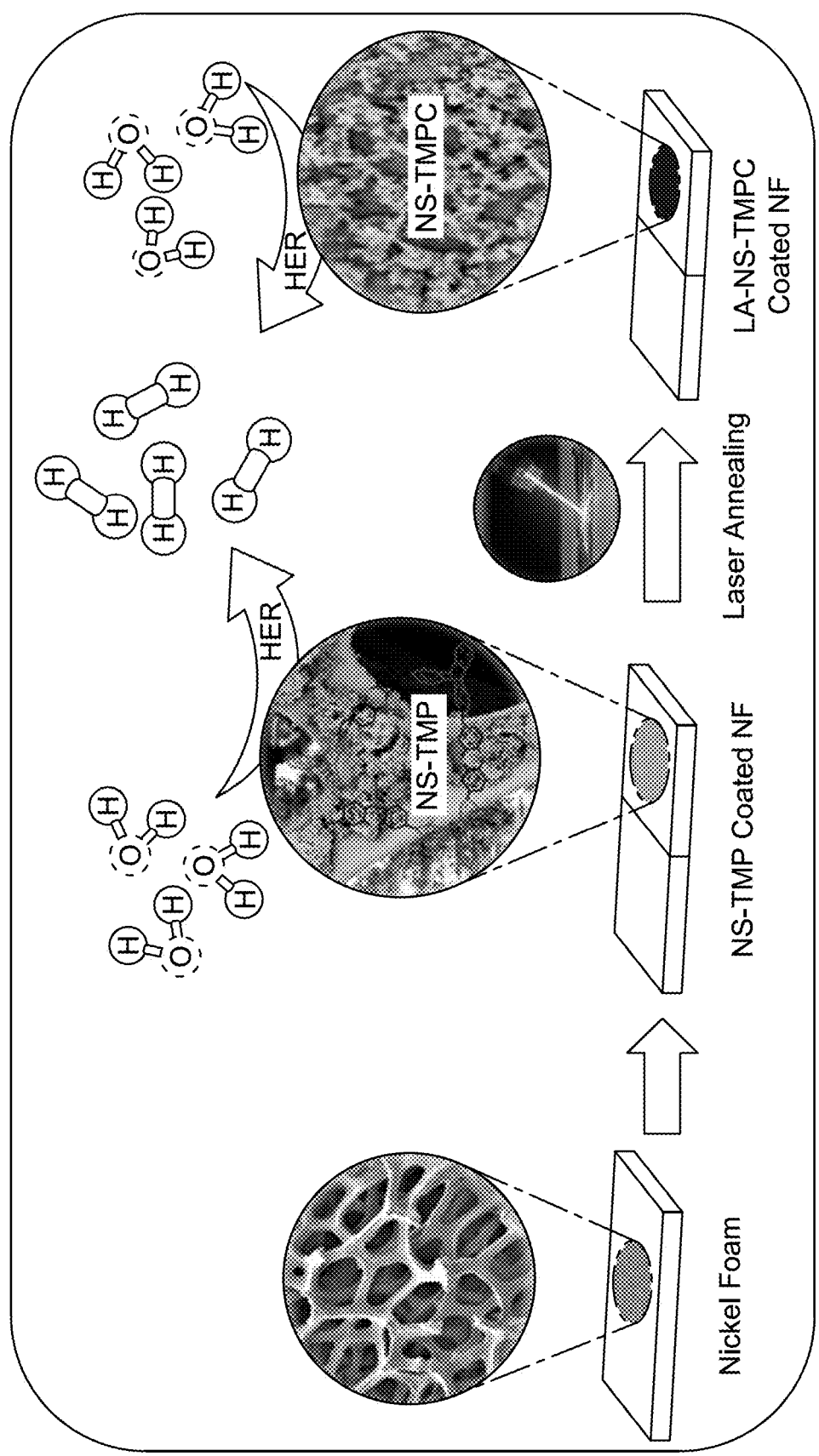
FIG. 1C illustrates an exemplary scheme of preparation of nitrogen and sulfur-containing triptycene-phenothiazine-based microporous polymer (NS-TMP) and laser-annealed nitrogen and sulfur co-doped triptycene-phenothiazine-derived carbon (LA-NS-TMPC) coated electrodes for hydrogen evolution reaction (HER), according to certain embodiments.

Example 3: Preparation of NS-TMP and Laser-Annealed Nitrogen and Sulfur Co-Doped Triptycene-Phenothiazine-Derived Carbon (LA-NS-TMPC) Electrodes Prior to the preparation of electrodes, NF pieces (1×2 cm) were cleaned in an ultrasonic bath for 10 minutes each with diluted HCl, acetone, and ethanol. Further, the NF was rinsed with deionized water and dried with high-purity N$_2$ gas. The NS-TMP polymer was deposited on both sides of a nickel foam substrate by drop-casting a suspension of TMP polymer in ethanol to achieve a mass loading of 10 mg cm$^{-2}$ of the polymer. The NS-TMP was further subjected to laser-assisted annealing using a CO$_2$ laser machine (Universal) with a wavelength of 10.6 µm, a maximum power of 30 W, and a speed of 100 mm s$^{-1}$, under ambient conditions to transform the NS-TMP into N, S co-doped carbonized structure (LA-NS-TMPC) on NF. Furthermore, the prepared electrode was cleaned by ultrasonication in ethanol to remove any residual untreated or carbonized particles and dried in a vacuum oven. A schematic representation of preparation of NS-TMP and LA-NS-TMPC coated electrodes for hydrogen evolution reaction (HER) is provided in FIG. 1C.

Example 4: Structural and Morphological Analysis

Using a Thermo Fisher Scientific (Nicolet 6700) instrument, Fourier transform infrared spectroscopy (FTIR) evaluations were conducted to gain insight into a presence of a plurality of functional groups. A 400 MHz Bruker instrument, functioning at 125.65 MHz was used to perform the solid-state $^{13}$C cross-polarization magic angle spinning (CP-MAS) nuclear magnetic resonance (NMR) analysis. Powder X-ray diffraction analysis (PXRD) was performed using a Rigaku Miniflex-II diffractometer that was connected to a Cu-Kα anode (wavelength=1.5416 Å). The morphological analysis were performed using a TESCAN-LYRA-3, (Czech Republic) field emission scanning electron microscopy (FE-SEM) instrument. Energy dispersive X-ray analysis EDX analysis was also performed using a TESCAN-LYRA-3, (Czech Republic). A JEOL-JEM2100F instrument (Japan) was used to perform transmission electron microscopy (TEM) studies at 200 kV acceleration voltage.

Example 5: Electrochemical Measurements

Electrochemical HER measurements were performed using an electrochemical workstation connected to a computer. A three-electrode cell setup was employed, consisting of a mercury/mercury oxide (Hg/HgO) reference electrode, a platinum (Pt) rod counter electrode, and the catalysts deposited on NF substrates as the working electrodes. The electrochemical cell was filled with 1.0 M potassium hydroxide (KOH) solution as the electrolyte. The working electrodes included NS-TMP and laser annealed NS-TMP (LA-NS-TMPC) catalysts deposited onto NF.

Cyclic voltammetry (CV) tests were initially conducted within a potential range of −0.5 to −1.5 V vs. Hg/HgO to assess the stability of the catalysts. Further, linear sweep voltammetry (LSV) curves were recorded at a scan rate of 2 mV s$^{-1}$, and the obtained data were corrected for uncompensated resistance (iR corrections). Electrochemical impedance spectroscopy (EIS) measurements were performed at an overpotential of 50 mV (vs. the reversible hydrogen electrode, RHE) over a frequency range of 0.01 Hz to 100 kHz. The long-term stability of the catalysts was evaluated through chronopotentiometry tests conducted at a constant current density of 50 mA cm$^{-2}$. All measured potentials were converted to the RHE scale.

Results

Figure 1D:
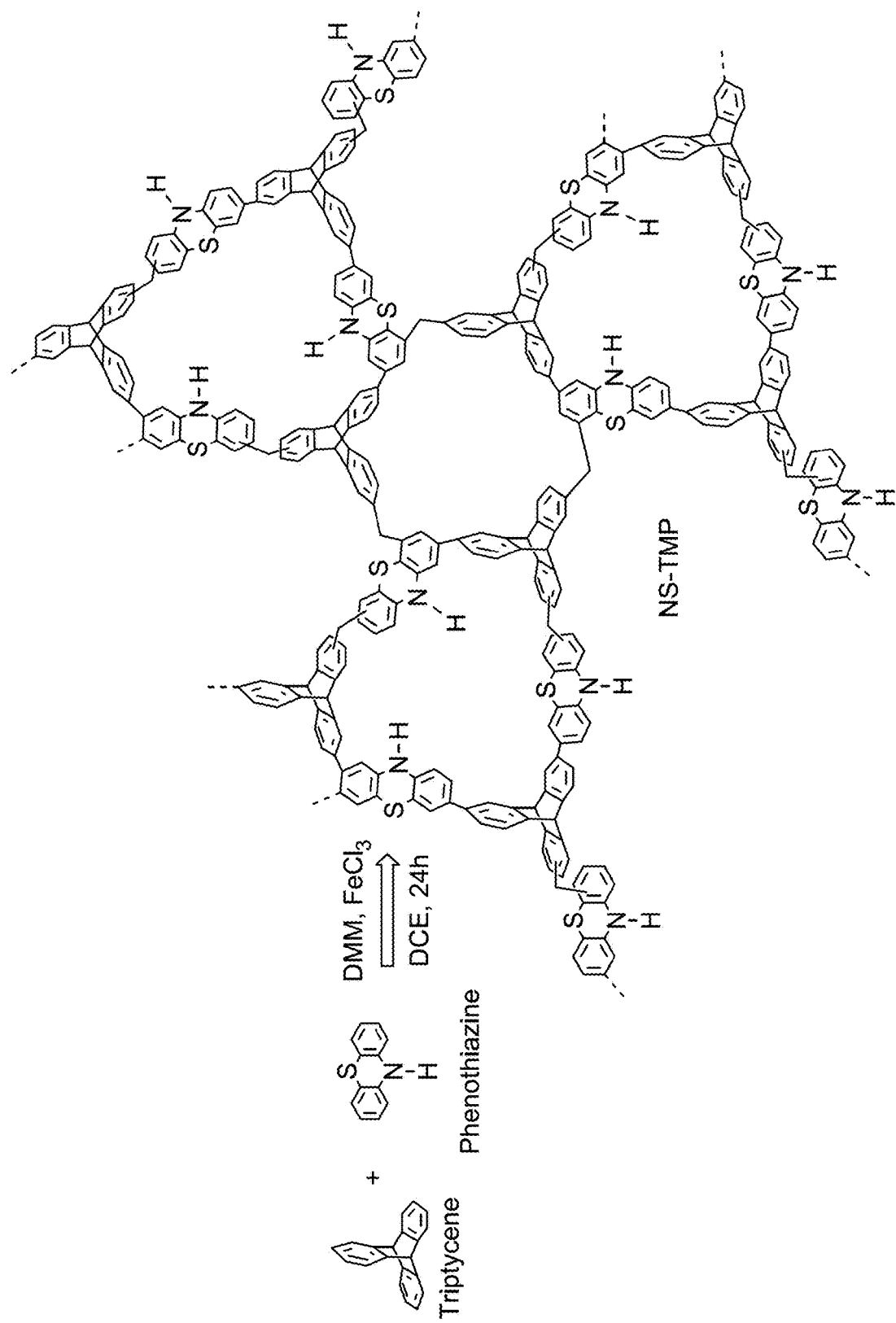
FIG. 1D illustrates a reaction scheme for the synthesis of the NS-TMP, according to certain embodiments.
Figure 2A:
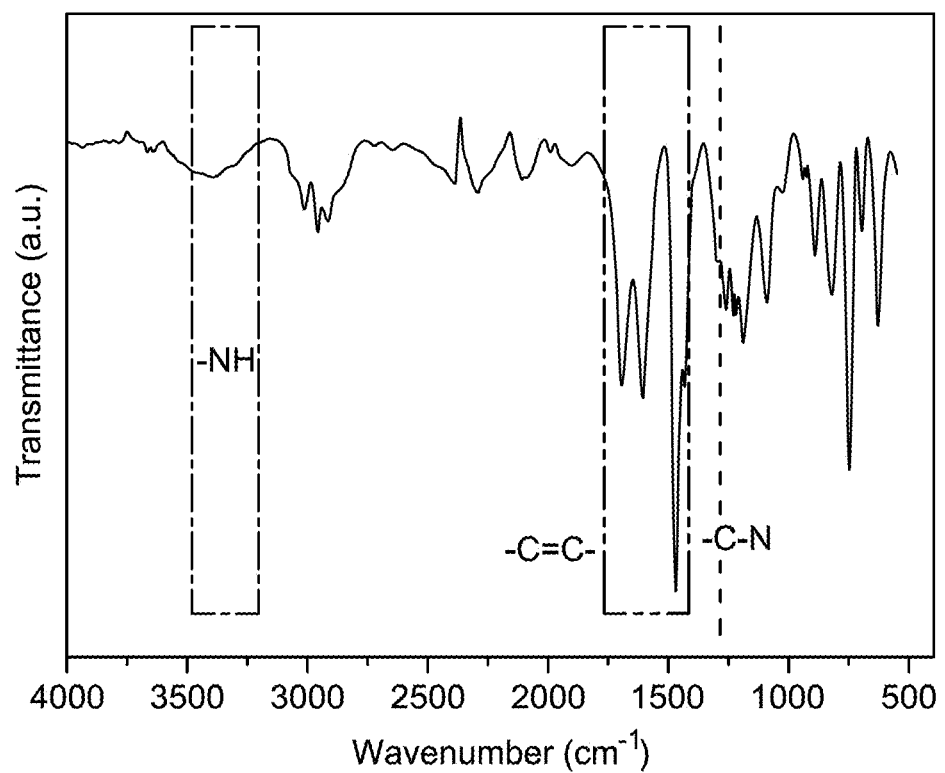
FIG. 2A illustrates Fourier transform infrared (FTIR) spectrum of the NS-TMP, according to certain embodiments.

The polymer NS-TMP was synthesized by using one pot and facile Friedel Crafts polymerization reaction between the two monomers triptycene (TRIP) and phenothiazine (PHEN) in the presence of FeCl$_3$ Lewis acid catalyst and dimethoxymethane as external crosslinker, as shown in FIG. 1D. NS-TMP was a brown-colored solid that was insoluble in several common organic solvents. The insoluble nature of NS-TMP is ascribed to extensive crosslinking and successful polymerization. The structural characterization was performed using Fourier transformation infrared spectroscopy (FTIR) and $^{13}$C CP/MAS NMR. The FTIR spectrum of the NS-TMP is shown in FIG. 2A.

Figure 2B:
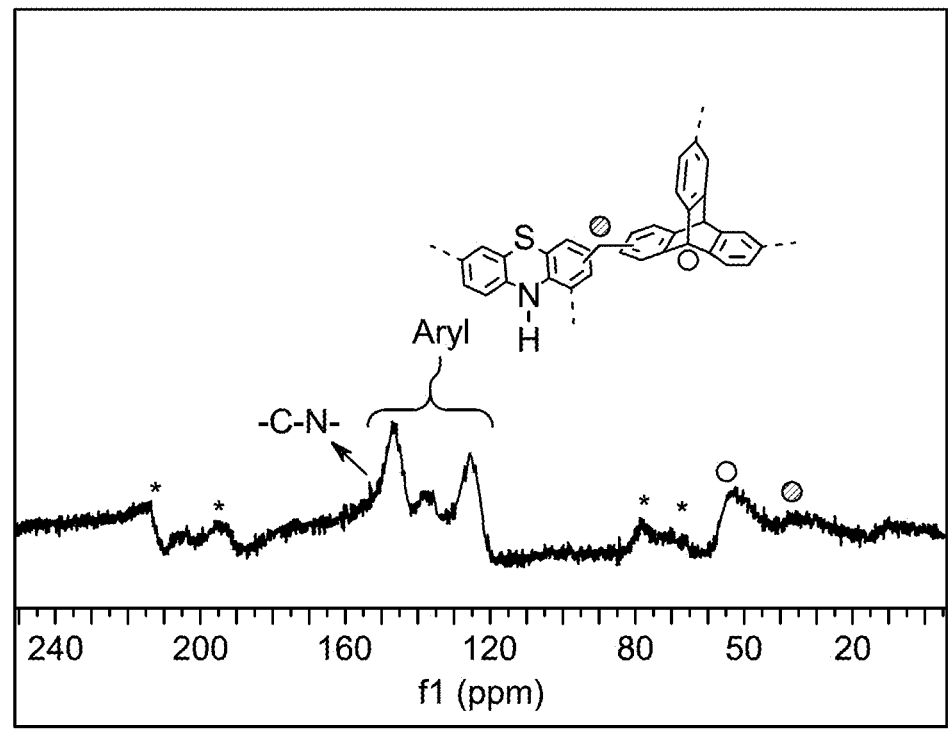
FIG. 2B illustrates a carbon-13 cross-polarization magic angle spinning nuclear magnetic resonance ($^{13}$C CP/MAS NMR) spectrum of the polymer NS-TMP, according to certain embodiments.

As shown in the FTIR spectrum of NS-TMP, the stretching vibration of the N—H bond was responsible for the peak that emerged at 3411 cm$^{-1}$ while the peak due to the bending vibration of the N—H bond was observed at 1182 cm$^{-1}$. A peak corresponding to the polymer's —C—N stretching vibration band was visible at around 1266 cm$^{-1}$ in the FT-IR spectrum of the NS-TMP. Furthermore, the peak at 2961 cm$^{-1}$ is consistent with stretching vibration of the triptycene bridge head —CH— group, which indicates effective crosslinking. In addition, the peaks at 1093 cm$^{-1}$ and 890 cm$^{-1}$ were ascribed in-plane deformation and out-of-plane bending of C—H bonds. Various aromatics —C=C— stretching vibrations peaks were observed in the range of 1696 cm$^{-1}$ to 1456 cm$^{-1}$ range. FIG. 2B depicts the $^{13}$C CP/MAS NMR spectrum of NS-TMP. As expected, the broad peaks in the region of 160-95 ppm were attributed to the aryl carbons of the aromatic rings. The peak observed at 153 ppm was assigned to nitrogen-substituted aromatic carbon (—C—NH—C—). The peaks due to bridgehead carbon of triptycene (—CH—) motifs appeared at about 52 ppm. The methylene carbons of (—CH$_2$—) linkages were observed at about 36 ppm. Therefore, $^{13}$C CP/MAS NMR analysis revealed the successful incorporation of phenothiazine and triptycene units in the framework of polymer NS-TMP.

Figure 2C:
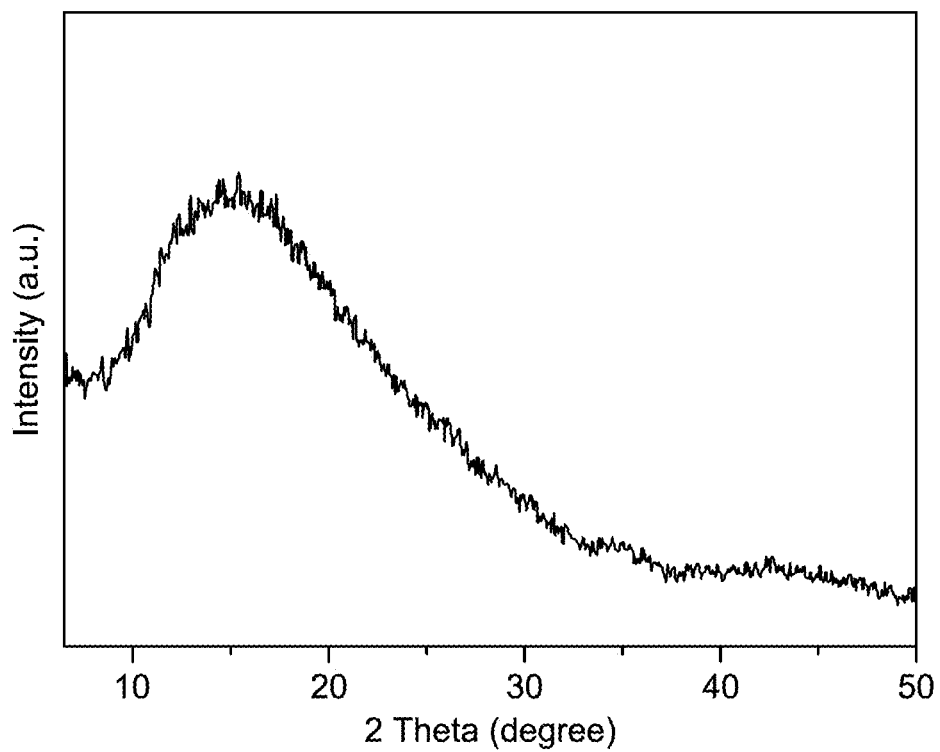
FIG. 2C illustrates an X-ray diffraction (XRD) pattern of NS-TMP, according to certain embodiments.
Figure 2D:
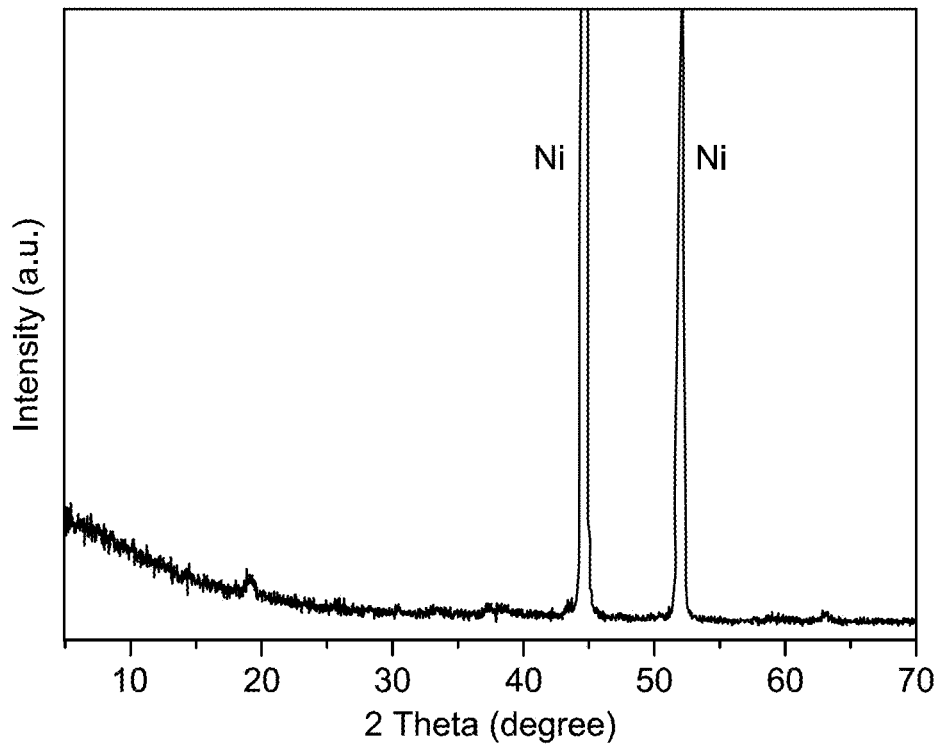
FIG. 2D illustrates an XRD pattern of LA-NS-TMPC coated on nickel foam, according to certain embodiments.

Further, powder X-ray diffraction (PXRD) patterns of the NS-TMP are shown in FIG. 2C, which shows a featureless broad spectrum indicating an amorphous nature, that may be attributed to the presence of rigid and bulky triptycene motifs in the polymeric framework. Further, the PXRD analysis of LA-NS-TMPC, as shown in FIG. 2D, revealed small broad peaks at around 18-20° in addition to Ni Peaks showing that LA-NS-TMPC has amorphous carbon.

Figure 3A:
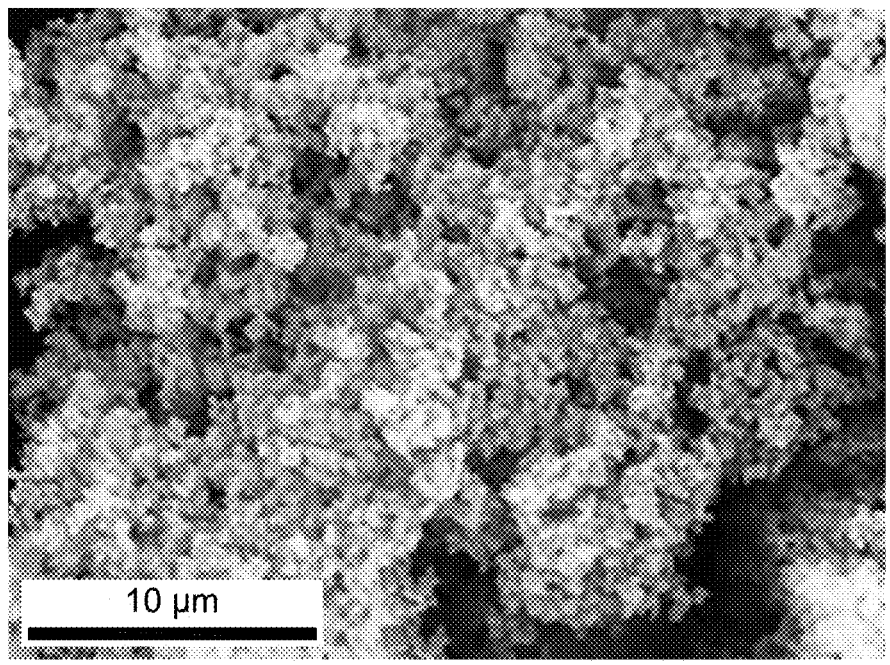
FIG. 3A illustrates a field emission scanning electron microscope (FESEM) micrograph of NS-TMP, at a magnification of 10 micrometres ($\mu$m), according to certain embodiments.
Figure 3B:
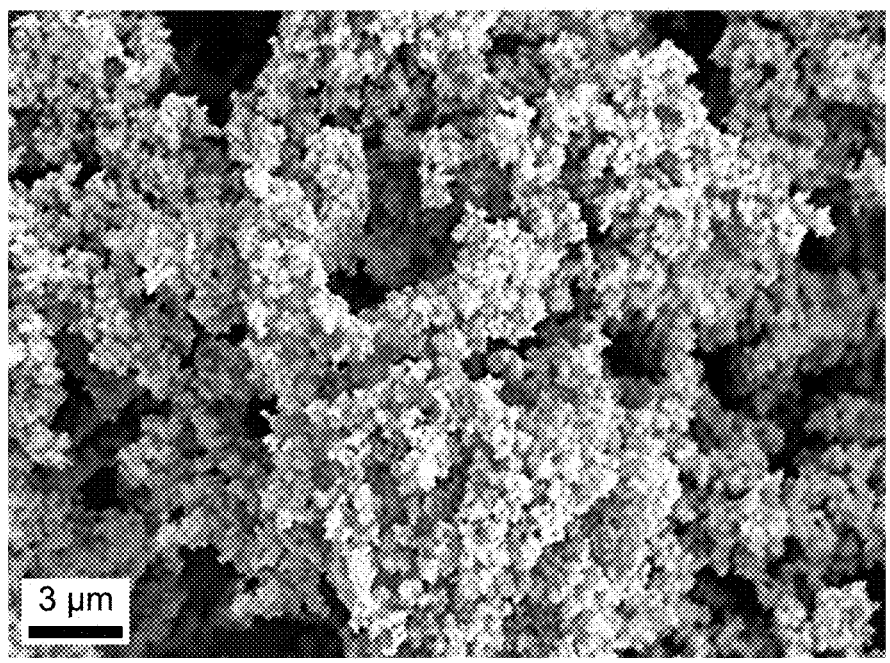
FIG. 3B illustrates a FESEM micrograph of NS-TMP, at a magnification of 3 $\mu$m, according to certain embodiments.
Figure 3C:
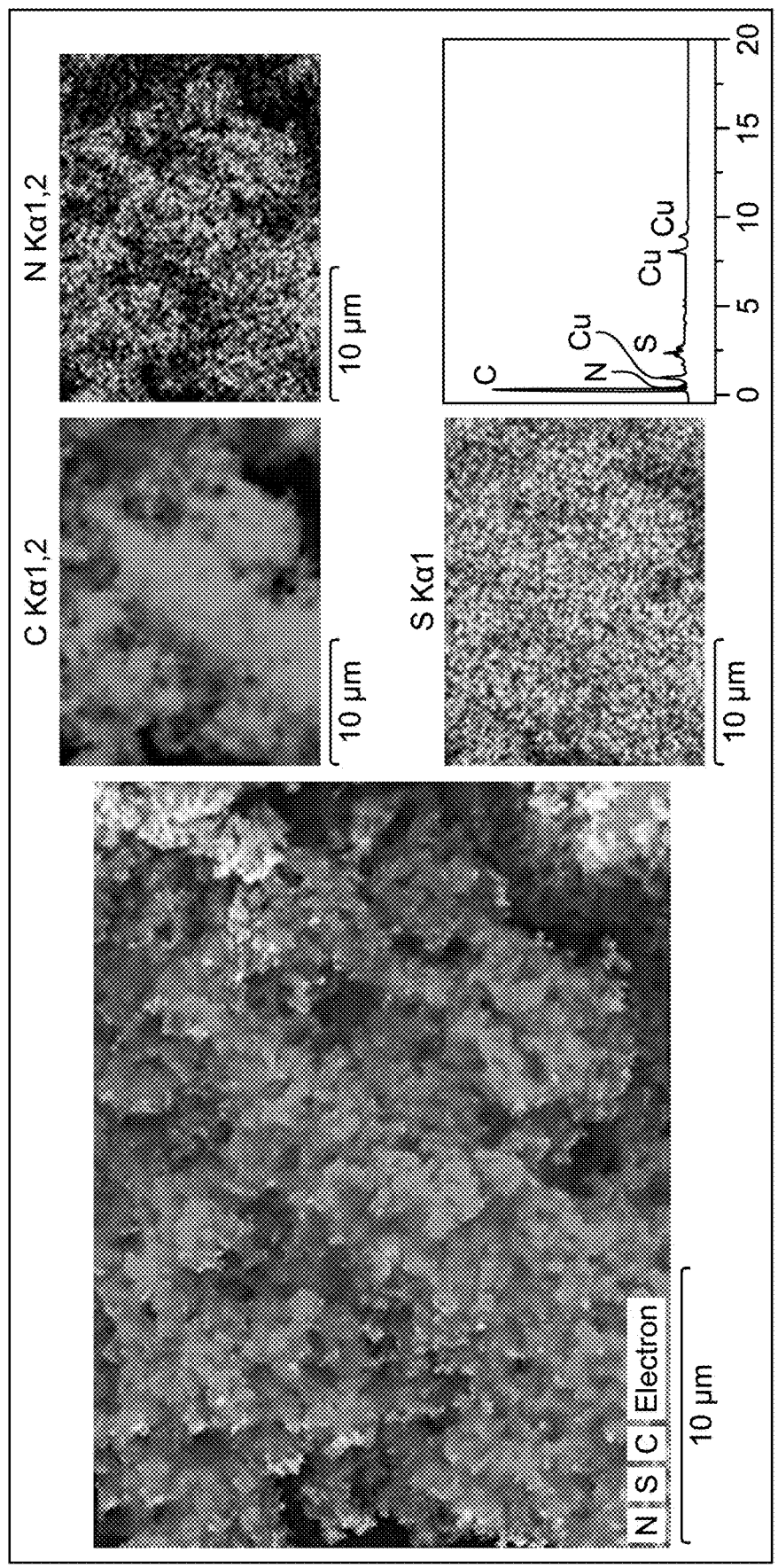
FIG. 3C illustrates a FESEM micrograph and elemental mapping of NS-TMP, according to certain embodiments.
Figure 3D:
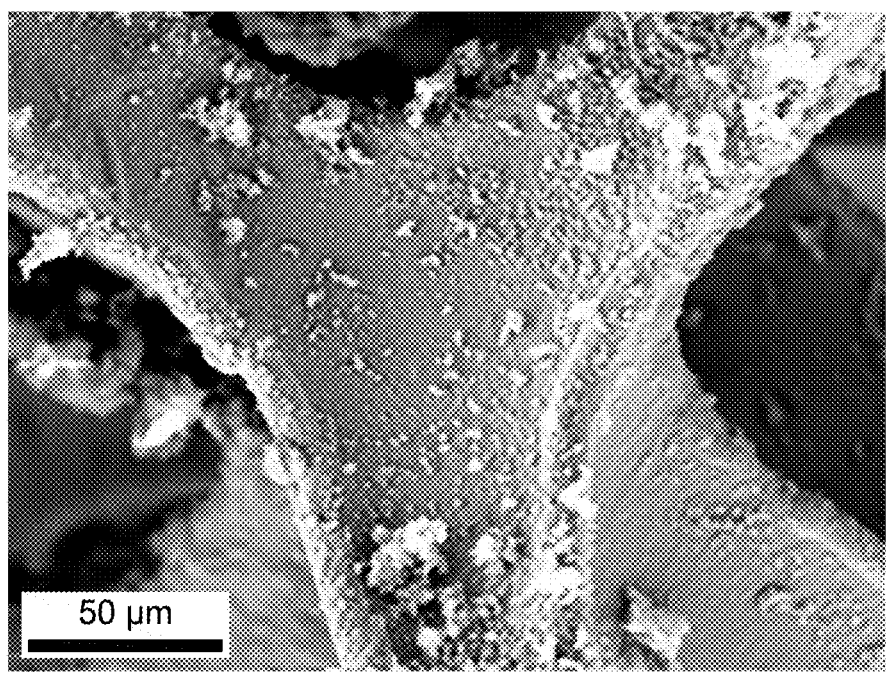
FIG. 3D illustrates a FESEM micrograph of LA-NS-TMPC, at a magnification of 50 $\mu$m, according to certain embodiments.
Figure 3E:
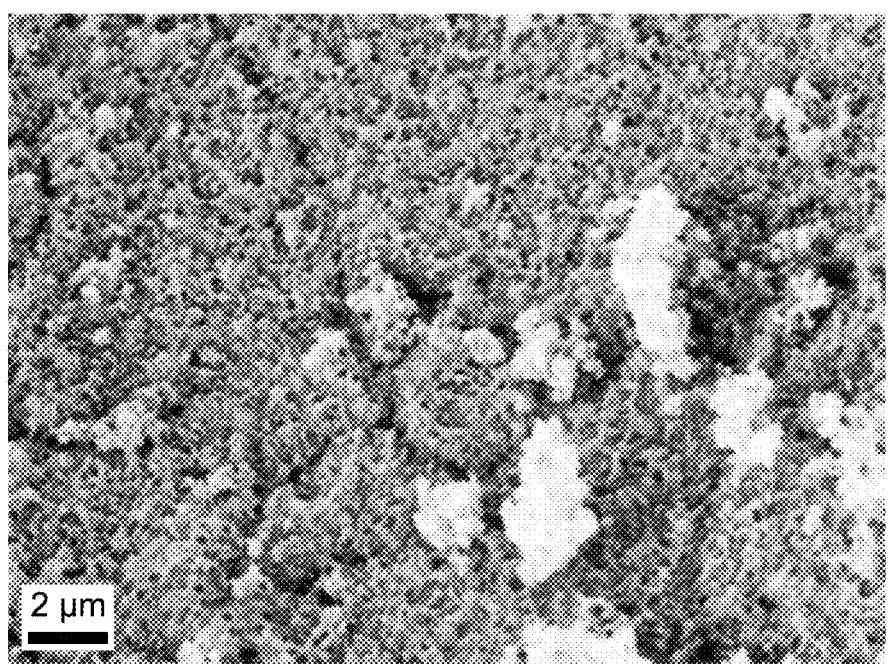
FIG. 3E illustrates a FESEM micrograph of LA-NS-TMPC, at a magnification of 2 $\mu$m, according to certain embodiments.
Figure 3F:
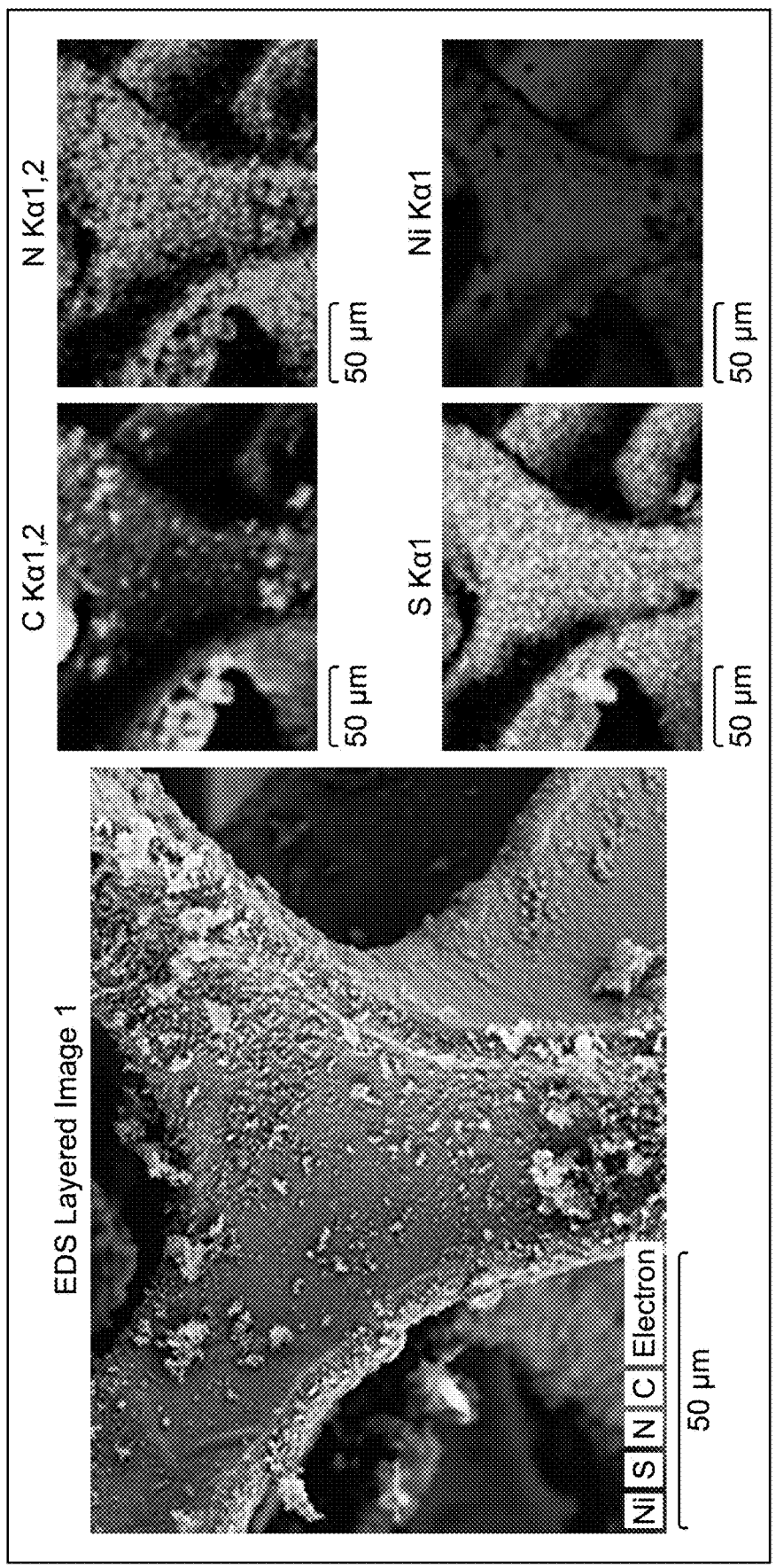
FIG. 3F illustrates a FESEM micrograph and elemental mapping of LA-NS-TMPC, according to certain embodiments.
Figure 3G:
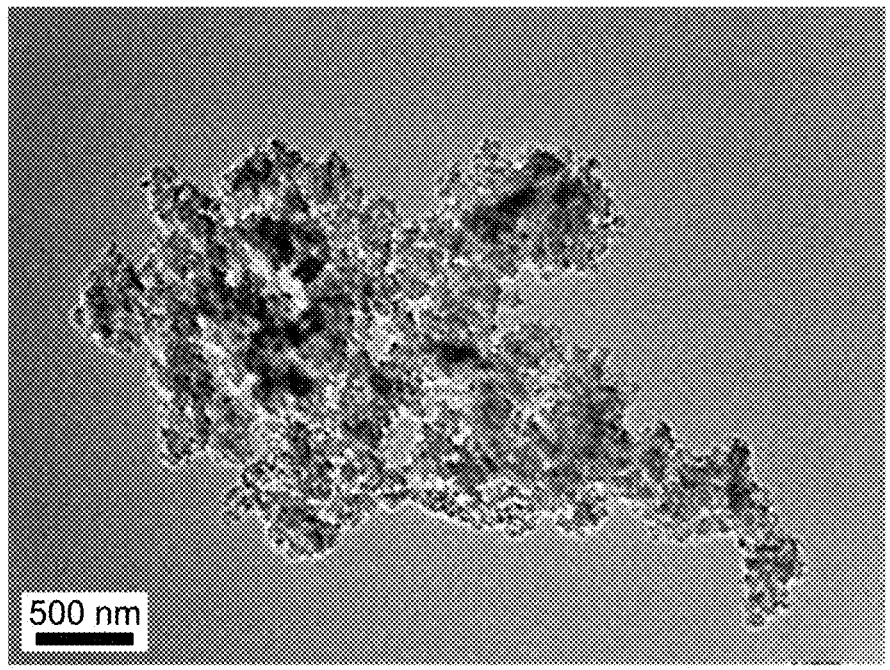
FIG. 3G illustrates a transmission electron microscope (TEM) image of LA-NS-TMPC, at a magnification of 500 nanometres (nm), according to certain embodiments.
Figure 3H:
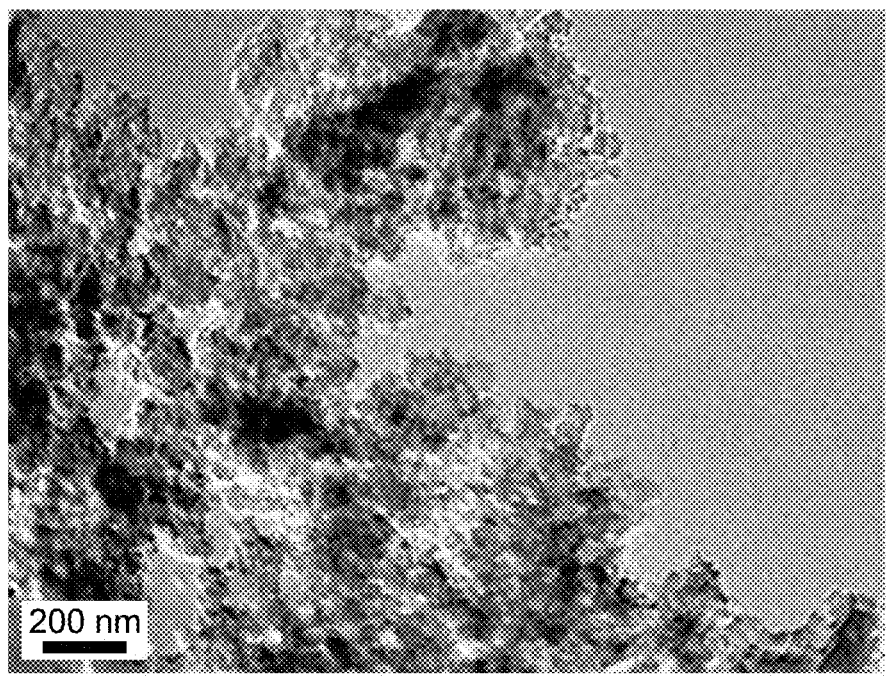
FIG. 3H illustrates a TEM image of LA-NS-TMPC, at a magnification of 200 nm, according to certain embodiments.
Figure 3I:
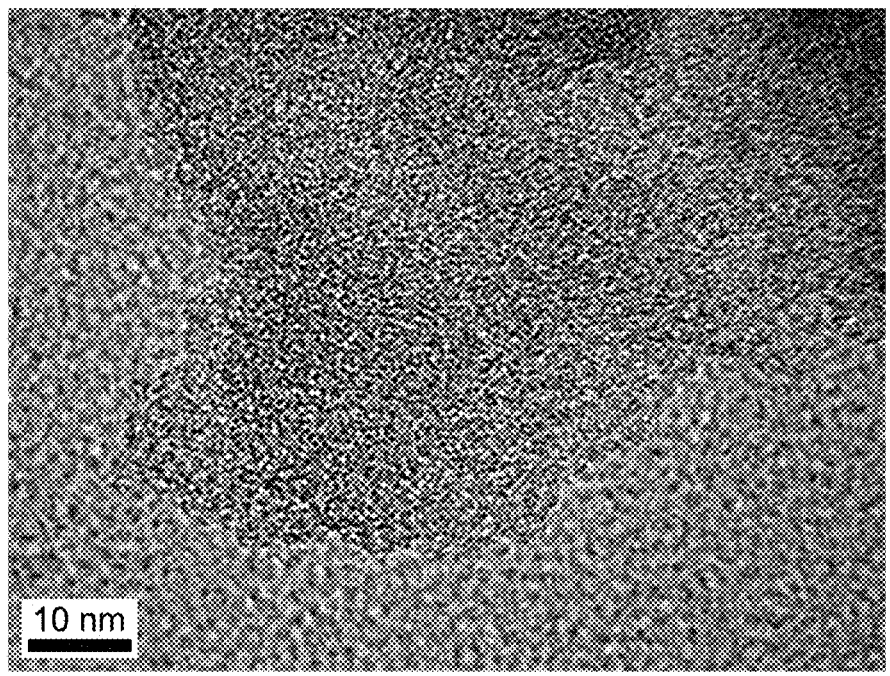
FIG. 3I illustrates a TEM image of LA-NS-TMPC, at a magnification of 10 nm, according to certain embodiments.
Figure 3J:
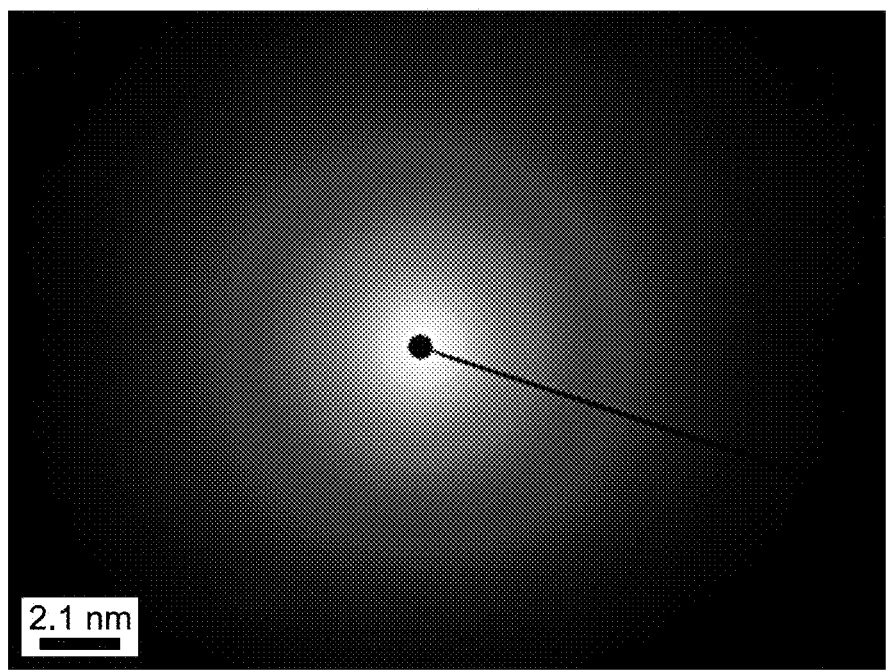
FIG. 3J illustrates selected area electron diffraction (SAED) image of LA-NS-TMPC, according to certain embodiments.

The morphological characterizations were performed using FESEM. The micrographs of polymer NS-TMP, as shown in FIGS. 3A-3C, depict the formation of irregular and spherical shape aggregates. The EDS analysis and elemental mapping of the NS-TMP sample are shown in FIG. 3C, which depicts that C, N, and S as the main elemental compositions. Further FIGS. 3D-3F demonstrate the morphology and elemental mapping of LA-NS-TMPC. In addition, LA-NS-TMPC shows the spherical shape aggregates on the surface of Ni foam. In order to further examine the morphologies of laser annealed electrocatalyst LA-NS-TMPC, TEM examinations were carried out, as shown in FIGS. 3G-3J. In particular, TEM analysis revealed that LA-NS-TMPC has nanosheet-like morphology and amorphous carbon structure as evident from high-resolution transmission electron microscopy (HRTEM) and selected area electron diffraction (SAED) analysis of LA-NS-TMPC.

Figure 4A:
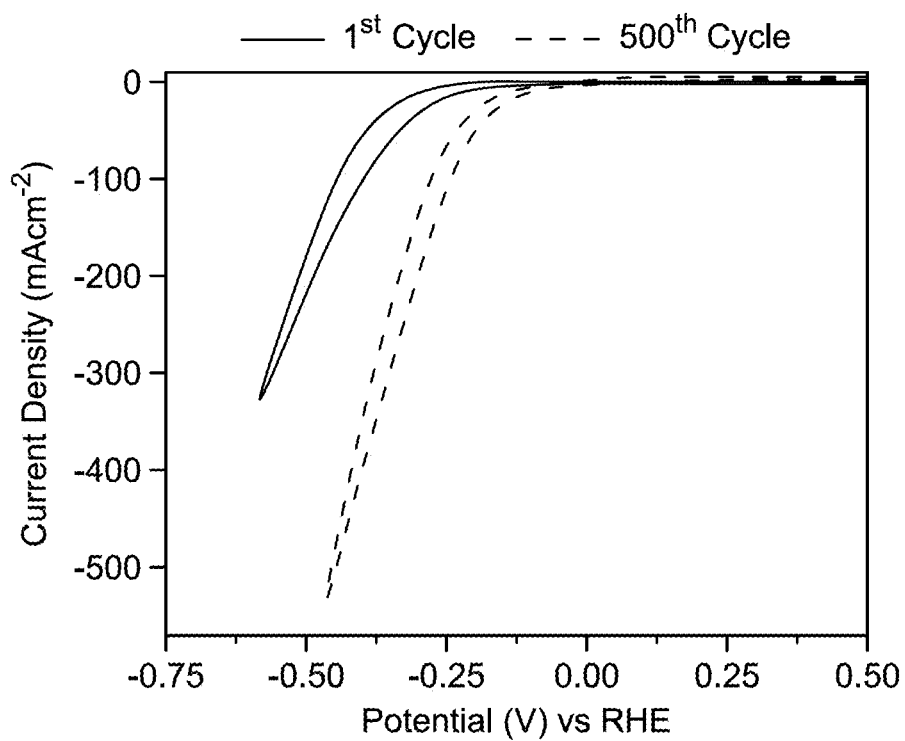
FIG. 4A illustrates the cyclic voltammetry (CV) curve of NS-TMP at a scan rate of 100 mV s$^{-1}$ in 1.0 M KOH electrolyte, according to certain embodiments.
Figure 4B:
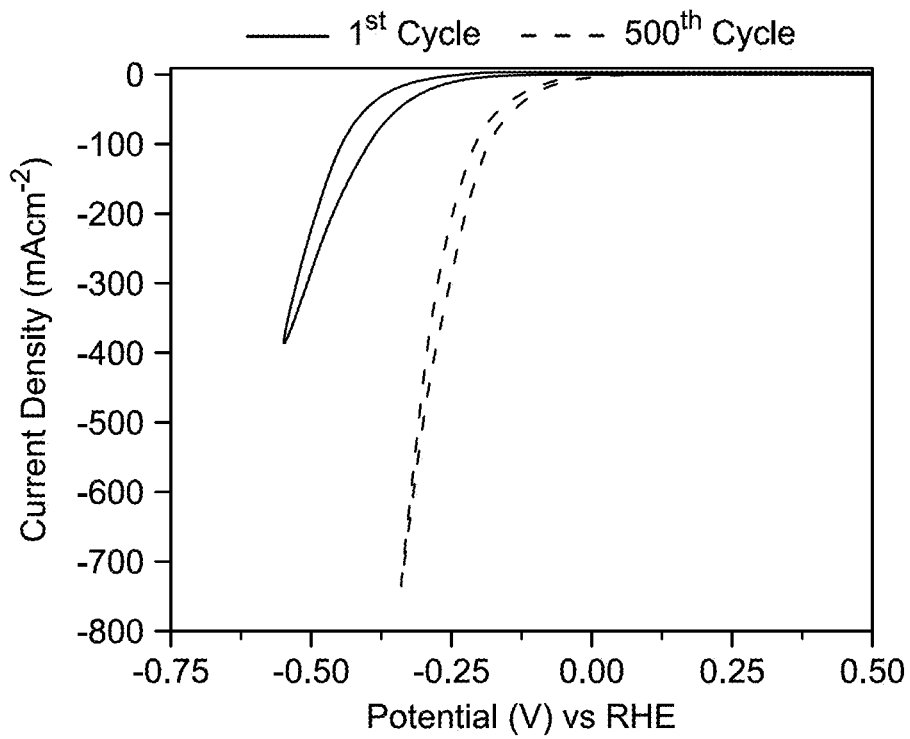
FIG. 4B illustrates the CV curve of LA-NS-TMPC at a scan rate of 100 mV s$^{-1}$ in 1.0 M KOH electrolyte, according to certain embodiments.
Figure 4C:
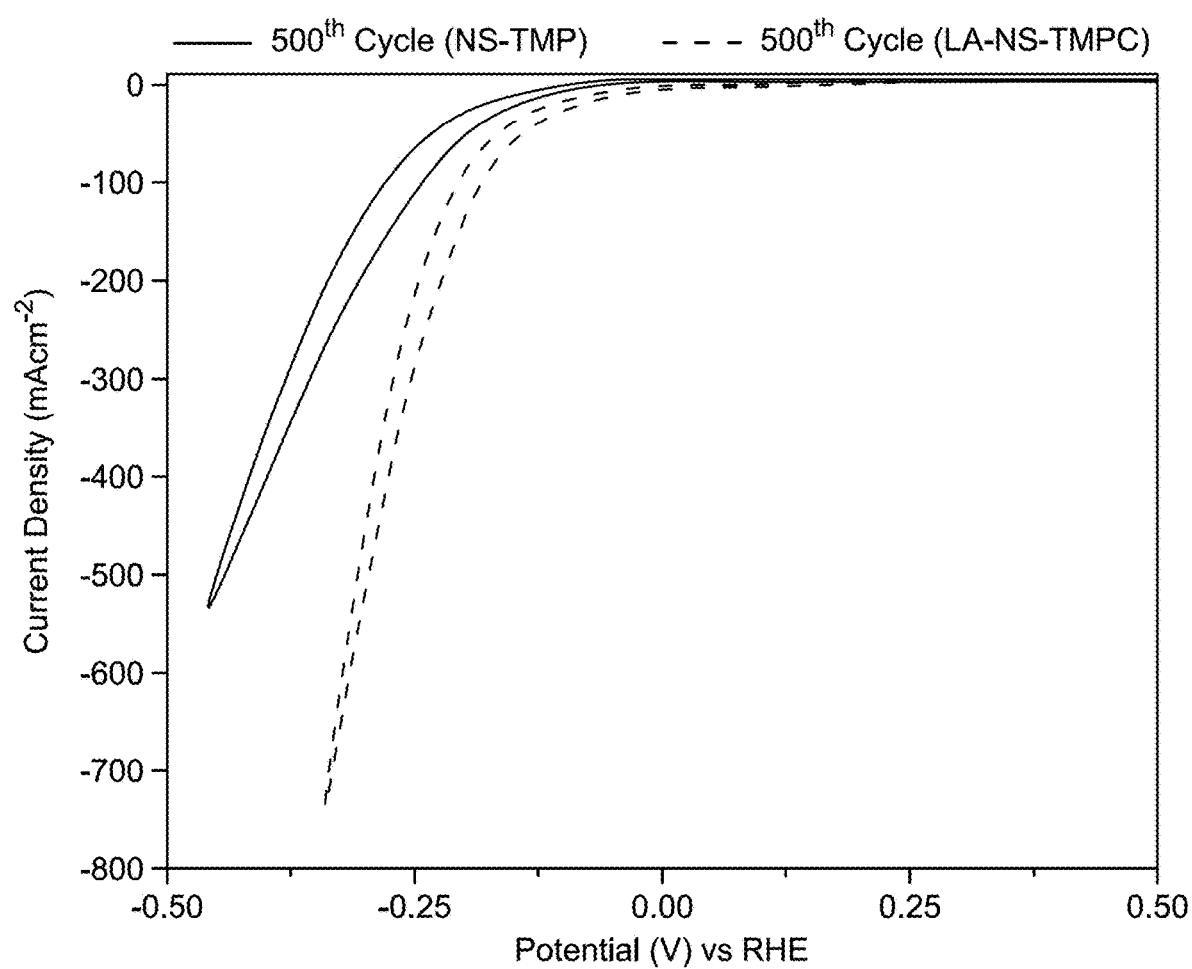
FIG. 4C illustrates a comparison of the 500th CV cycle for NS-TMP and LA-NS-TMPC, according to certain embodiments.

The electrocatalytic activities of the NS-TMP and LA-NS-TMPC deposited on a nickel foam substrate, obtained through the laser-induced annealing (LA) process, were examined for the HER in an alkaline medium (1 M KOH electrolyte) at room temperature, utilizing a three-electrode electrochemical cell. Cyclic voltammetry (CV) measurements conducted for up to 500 cycles revealed that the CV curves for both materials exhibited a shift towards lower potentials after 500 cycles, indicating an activation of the catalyst surface and enhanced HER performance, as shown in FIGS. 4A-4B. The comparison of the 500th cycle demonstrated a significant increase in current density and a lower overpotential compared to the NS-TMP material within the same potential range, as shown in FIG. 4C. The aforementioned observation indicates a substantial improvement in electroactivity and more efficient electron transfer kinetics at the electrode surface for the LA-NS-TMPC. Additionally, while the NS-TMP did not exhibit a decrease in activity over 500 cycles, the current density for the LA-NS-TMPC increased between the 1$^{st}$ and 500$^{th}$ cycles, indicating a phenomenon known as surface activation, where the electrode surface undergoes restructuring, leading to improved electron transfer kinetics and higher electroactivity. The observed increase in current density and decrease in overpotential for the LA-NS-TMPC strongly support the desirable effects of laser annealing and nitrogen-sulfur doping, likely introducing additional redox centers and enhancing the overall conductivity of the LA-NS-TMPC.

Figure 5A:
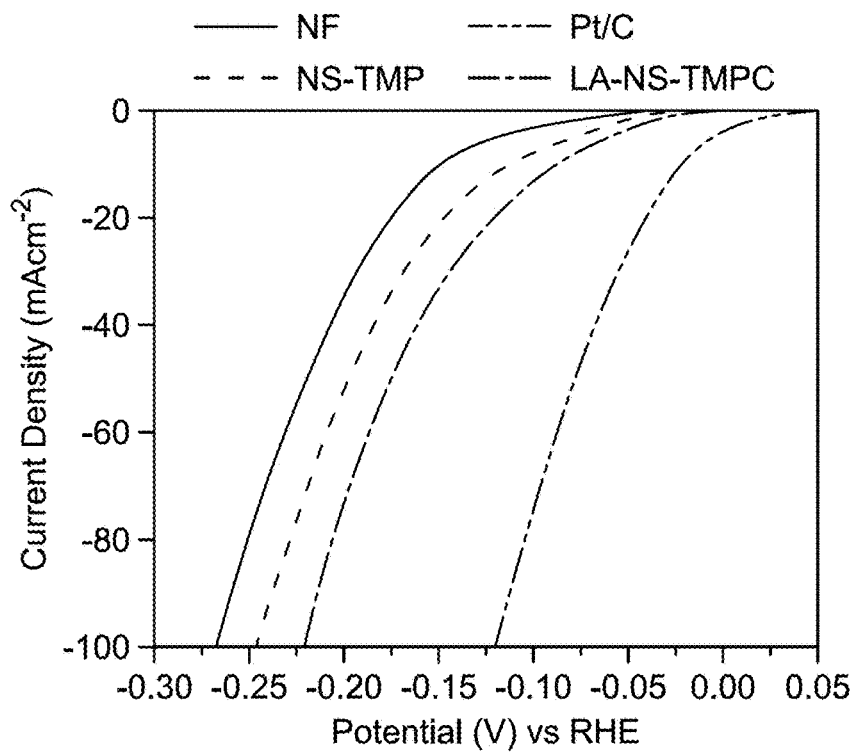
FIG. 5A illustrates linear sweep voltammetry (LSV) curves of various electrocatalysts recorded at 2 mV s$^{-1}$ in 1.0 M KOH electrolyte, according to certain embodiments.

The HER activity of the synthesized catalysts, NS-TMP and LA-NS-TMPC, was evaluated using linear sweep voltammetry (LSV) with a slow scan speed of 2 mV s$^{-1}$ measurements in 1 M KOH and compared with commercial benchmarks, Pt/C and blank NF. As shown in FIG. 5A, the LA-NS-TMPC electrode exhibited superior HER kinetics compared to the NS-TMP electrode. The LSV measurements revealed the LA-NS-TMPC catalyst required the lowest overpotential of 80 mV to attain a current density of 10 mA cm$^{-2}$. In contrast, higher overpotentials of 110 mV was required by the NS-TMP electrode to reach the same current density benchmark. The bare Ni-foam substrate displayed remarkably sluggish HER kinetics, necessitating a substantially elevated overpotential to drive the HER reaction.

Figure 5B:
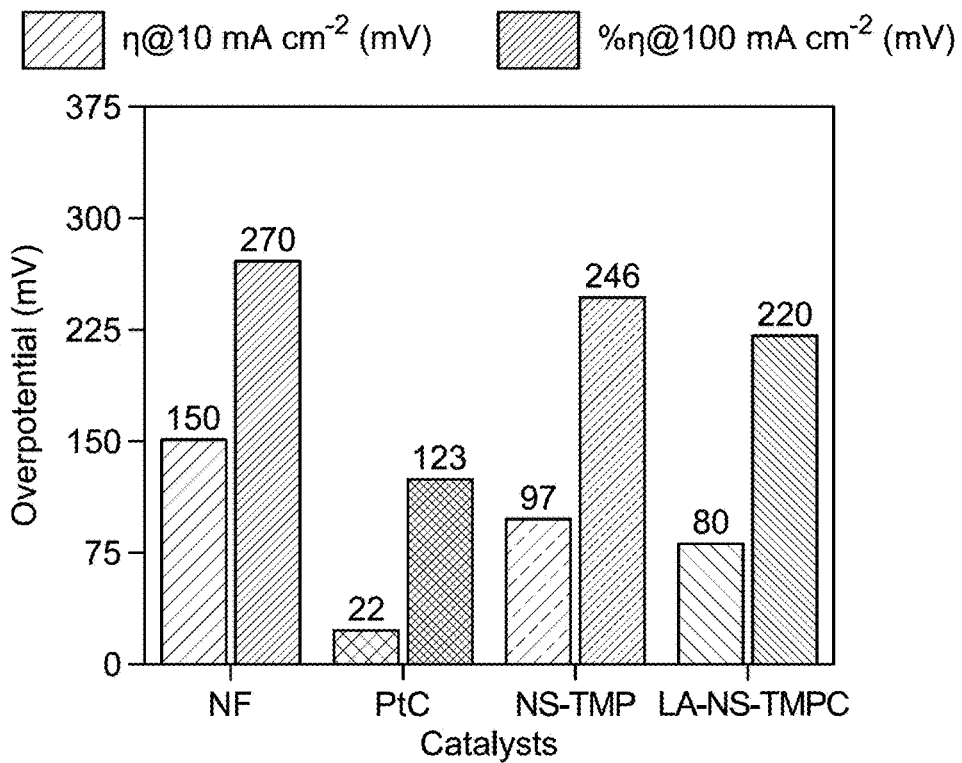
FIG. 5B illustrates the comparison of overpotentials at 10 mA cm$^{-2}$ and 100 mA cm$^{-2}$ for different electrocatalysts, according to certain embodiments.
Figure 6A:
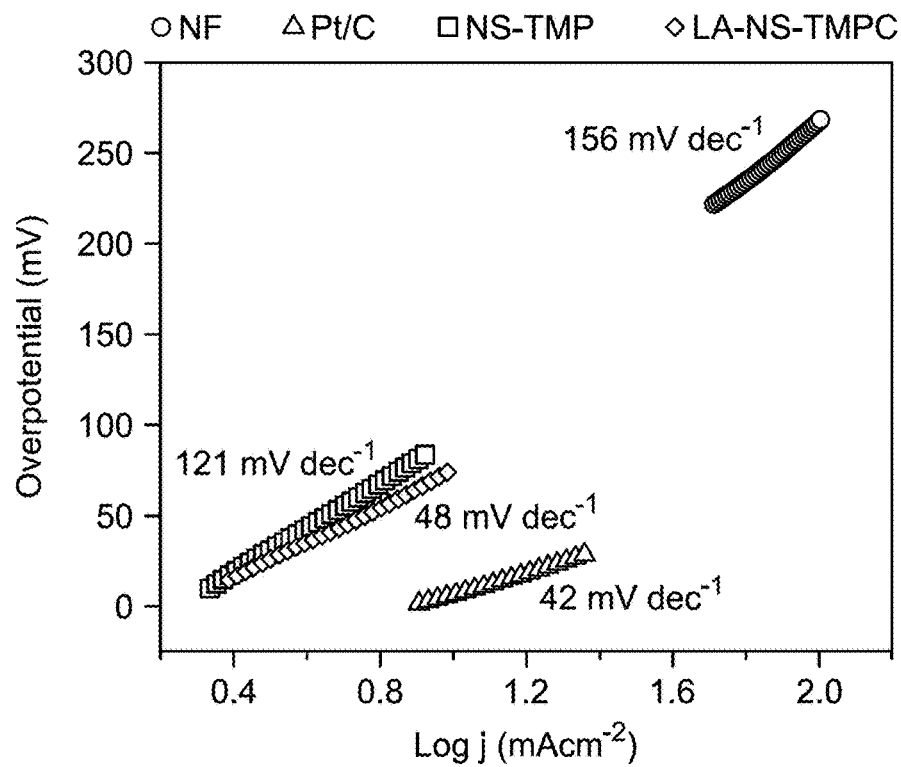
FIG. 6A illustrates the Tafel slope plots derived from LSV curves of the synthesized electrocatalysts, according to certain embodiments.

In order to further elucidate catalytic performance, parameters such as overpotential, Tafel slope, and charge transfer resistance were examined. The overpotential (η), a measure of energy loss associated with driving an electrochemical reaction away from equilibrium, was compared at current densities of 10 and 100 mA cm$^{-2}$. An analysis of the quantitative HER performance indicators, including η requirements at current densities of 10 mA cm$^{-2}$ ($\eta_{10}$) and 100 mA cm$^{-2}$ ($\eta_{100}$), is illustrated in FIG. 5B. The NS-TMP electrocatalyst exhibited the highest overpotential demands, with $\eta_{10}$=110 mV and $\eta_{100}$=246 mV. Conversely, the LA-NS-TMPC catalyst exhibited the lowest overpotential requirements of $\eta_{10}$=80 mV and $\eta_{100}$=220 mV to attain the respective current density. The comparison of overpotential with other carbon-based electrocatalysts for HER reported in literature is summarized in Table 1. In particular, the LA-NS-TMPC catalyst consistently exhibited lower overpotential values of η at both current densities compared to NS-TMP, implying higher efficiency in facilitating the HER. Furthermore, both synthesized catalysts outperformed commercial NF, exhibiting a desirable HER activity. Further, Tafel slope analysis provided insights into reaction kinetics and revealed that the LA-NS-TMPC catalyst exhibited a lower Tafel slope of 48 mV dec$^{-1}$ compared to NS-TMP (121 mV dec$^{-1}$), as shown in FIG. 6A. The aforementioned value is comparable to the commercial Pt/C (42 mV dec$^{-1}$)

and significantly lower than NF (156 mV dec$^{-1}$), indicating faster HER kinetics facilitated by the laser annealing process. Typically, electrocatalysts with Tafel slope values between 50 to 120 mV dec$^{-1}$ are considered to follow the Volmer-Heyrovsky mechanism for the HER.

TABLE 1

Comparison of the electrocatalytic activity of synthesized catalysts with other literature reported HER catalyst.

| Name of Catalyst | Overpotential at 10 mA cm$^{-2}$ (mV) | Tofel Slope (mV/dec) | Reference |
| --- | --- | --- | --- |
| NS-TMP | 97 | 121 | Present Disclosure |
| LA-NS-TMPC | 80 | 48 | Present Disclosure |
| NF | 150 | 156 | Present Disclosure |
| NCFs | 198.6 | 131.3 | 1* |
| Ni@COP | 290 | 112 | 2* |
| N-HCNFs | 243 | 111 | 3* |
| GCE-S-GNs-1000 | 760 | 128 | 4* |
| 3DNG-P | 128 | 66 | 5* |
| CNx@N-RGO | 193 | 54 | 6* |
| NS-500 | 276 | 81 | 7* |
| SG | 423 | 148 | 8* |
| S-GrFO1 | 443 | 165 | 9* |

1* Sun J, Ge Q, Guo L, Yang Z. Nitrogen doped carbon fibers derived from carbonization of electro spun polyacrylonitrile as efficient metal-free HER electrocatalyst Int J Hydrogen Energy 2020; 45:4035-42, incorporated herein by reference in its entirety.

2* Samal A, Kori D K K, Jain A, Das A K. A nickel-doped two-dimensional covalent organic polymer (2d-cop) for electrocatalytic hydrogen evolution reaction ACS Appl Energy Mater 2024; 7:2715-25, incorporated herein by reference in its entirety.

3* Zheng Y, Chen S, Song H, Guo H, Zhang KAI, Zhang C, and coworker, Nitrogen-doped hollow carbon nanoflowers from a preformed covalent triazine framework for metal-free bifunctional electrocatalysis Nanoscale 2020; 12:14441-7, incorporated herein by reference in its entirety.

4* Shervedani R K, Amini A. Sulfur-doped graphene as a catalyst support: Influences of carbon black and ruthenium nanoparticles on the hydrogen evolution reaction performance. Carbon N Y 2015; 93:762-73, incorporated herein by reference in its entirety.

5* Tian Y, Ye Y, Wang X, Peng S, Wei Z, Zhang X, and coworkers, Three-dimensional N-doped, plasma-etched graphene: Highly active metal-free catalyst for hydrogen evolution reaction Appl Catal A Gen 2017; 529:127-33, incorporated herein by reference in its entirety.

6* Gangadharan P K, Unni S M, Kumar N, Ghosh P, Kurungot S. Nitrogen-doped graphene with a three-dimensional architecture assisted by carbon nitride tetrapods as an efficient metal-free electrocatalyst for hydrogen evolution ChemElectroChem 2017; 4:2643-52, incorporated herein by reference in its entirety.

7* Ito Y, Cong W, Fujita T, Tang Z, Chen M. High catalytic activity of nitrogen and sulfur co-doped nanoporous graphene in the hydrogen evolution reaction Angew. Chem. Int. Ed. 2015; 54:2131-6, incorporated herein by reference in its entirety.

8* Tian Y, Wei Z, Wang X, Peng S, Zhang X, Liu W. Plasma-etched, S-doped graphene for effective hydrogen evolution reaction Int J Hydrogen Energy 2017; 42:4184-92, incorporated herein by reference in its entirety.

9* Ersozoglu M G, Gursu H, Gumrukcu S, Sarac A S, Sahin Y. Single step electrochemical semi-exfoliated s-doped graphene-like structures from commercial carbon fiber as efficient metal-free catalyst for hydrogen evolution reaction ChemElectroChem 2022; 9: e202101455, incorporated herein by reference in its entirety.

Figure 6B:
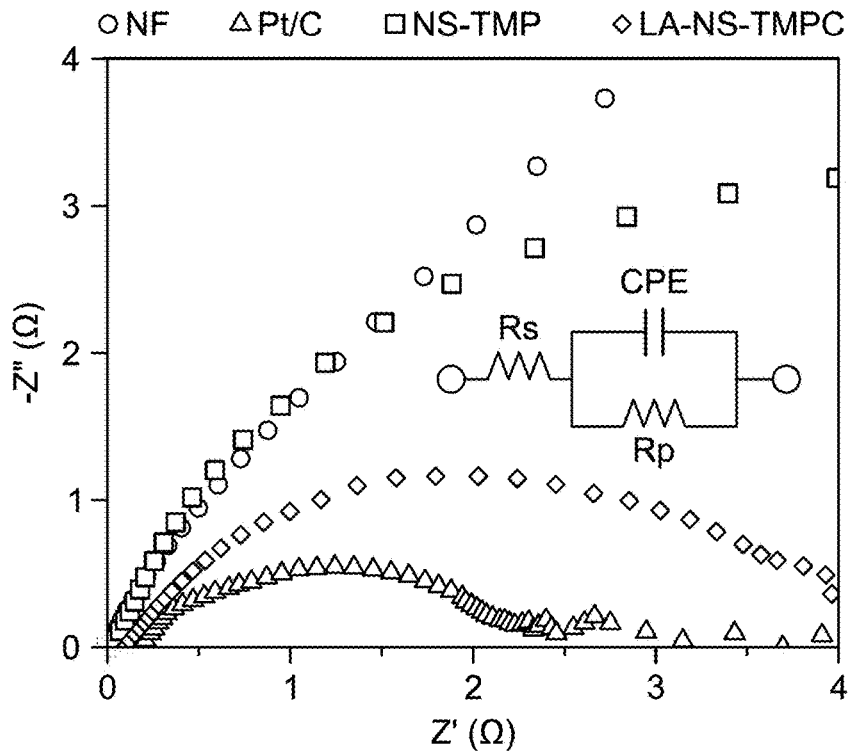
FIG. 6B illustrates the Nyquist plots obtained from electrochemical impedance spectroscopy for the synthesized electrocatalysts, with an inset showing the equivalent circuit model, according to certain embodiments.

The inherent conductivities of catalysts are vital for determining the performance of the catalysts in the HER. Accordingly, FIG. 6B illustrates the EIS Nyquist plots. In particular, EIS Nyquist plots of both the synthesized electrocatalysts NS-TMP and LA-NS-TMPC display semicircles of dissimilar diameters, which signify dissimilar charge transfer resistances (Rct) at the electrode interface. The model diagram of the circuit utilized for fitting the EIS data is shown in an inset of FIG. 6B. The LA-NS-TMPC electrode exhibited the lowest Rct value of (1.92Ω) compared with Pt/C (2.28Ω), NS-TMP (5.32Ω), and NF (47.89Ω), signifying that the LA-NS-TMPC electrode exhibits the maximum electron transfer ability among all examined catalysts. The EIS outcomes affirm that the LA-NS-TMPC electrocatalyst contains enhanced active catalytic sites, quickening the charge and mass diffusion rates and improving the HER efficiency. Furthermore, ECSAs for each electrode were calculated to estimate the intrinsic activities of the electrocatalysts (NS-TMP and LA-NS-TMPC). The double-layer capacitance ($C_{dl}$) values were determined for each electrocatalyst from their respective CV curves measured in the non-Faradaic region. The cyclic voltammetry profiles for each electrocatalyst were recorded in a 1 M KOH solution, with scan rates ranging from 5 mV s$^{-1}$ to 60 mV s$^{-1}$. As such, the laser annealed electrocatalyst LA-NS-TMPC exhibited relatively lower double-layer capacitance ($C_{dl}$) of about 167 mF cm$^{-2}$ compared with the Ca of NS-TMP of about 215 mF cm$^{-2}$. Usually, electrodes with lower $C_{dl}$ values have more electrochemically active sites. Therefore, ECSAs studies indicated that LA-NS-TMPC has more accessible active sites on its surface.

The catalytic efficiency of the LA-NS-TMPC catalyst may be attributed to the synergistic cooperation between nitrogen and sulfur heteroatoms integrated into a carbon structure thereof. The aforesaid heteroatoms possess differing electronegativities, which induce electronic effects and redistribute charges, thereby altering the electronic structure and augmenting the catalytic activity at the active sites. The above described synergistic effect, combined with the structural and electronic modifications brought about by laser annealing, significantly contributes to the superior electrocatalytic performance exhibited by the LA-NS-TMPC catalyst.

The consistent improvement observed across various electrochemical characterizations may be ascribed to the substantial impact of laser annealing on the properties of the catalyst formed herein. In particular, laser annealing is likely to enhance the overall conductivity of the polymer, facilitating faster electron transport and promoting the HER at the electrode surface. Further, the laser annealing process has the potential to introduce additional defect sites or functionalities within the catalyst structure, which can act as active centers for the HER, leading to the observed higher current density in hydrogen production. Furthermore, improved conductivity and the potential increase in active sites resulting from laser annealing contribute to a reduction in charge transfer resistance, permitting accelerated electron transfer kinetics during the HER, as evidenced by the lower Tafel slopes and charge transfer resistance values.

Moreover, the cooperation between nitrogen and sulfur heteroatoms is pivotal in the performance of the LA-NS-TMPC catalyst. The heteroatoms, possessing disparate electronegativities, induce electronic effects and redistribute charges within the catalyst structure. The aforementioned charge redistribution modifies the electronic structure, improving the catalytic activity at the active sites. The interplay between heteroatom doping and the structural and electronic modifications induced by laser annealing contributes significantly to the superior electrocatalytic performance observed for the LA-NS-TMPC catalyst.

Figure 7A:
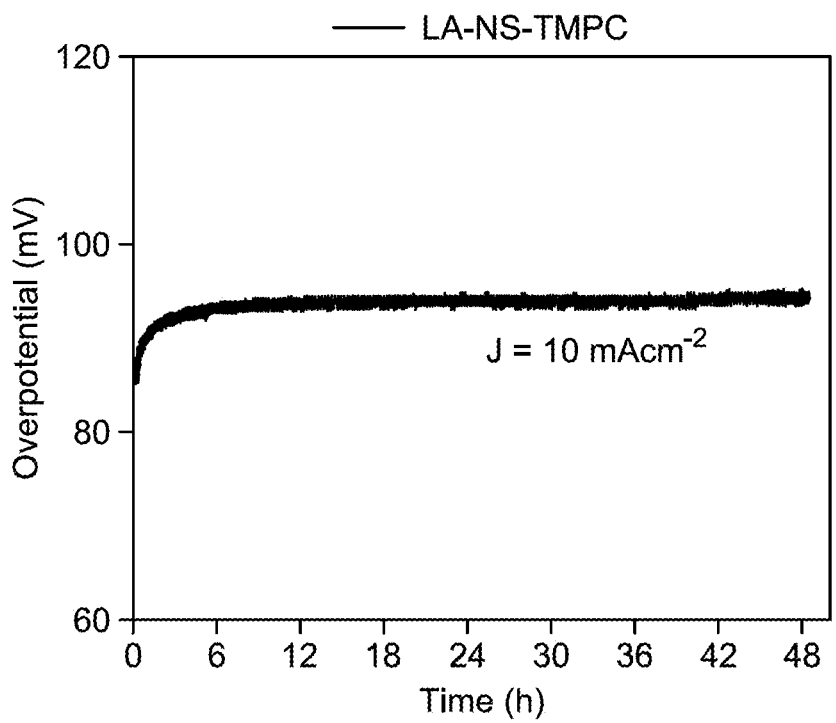
FIG. 7A illustrates the chronopotentiometric stability profile of LA-NS-TMPC electrocatalyst measured at a fixed current density of 10 mA cm$^{-2}$ in 1.0 M KOH for 48 hours, according to certain embodiments.
Figure 7B:
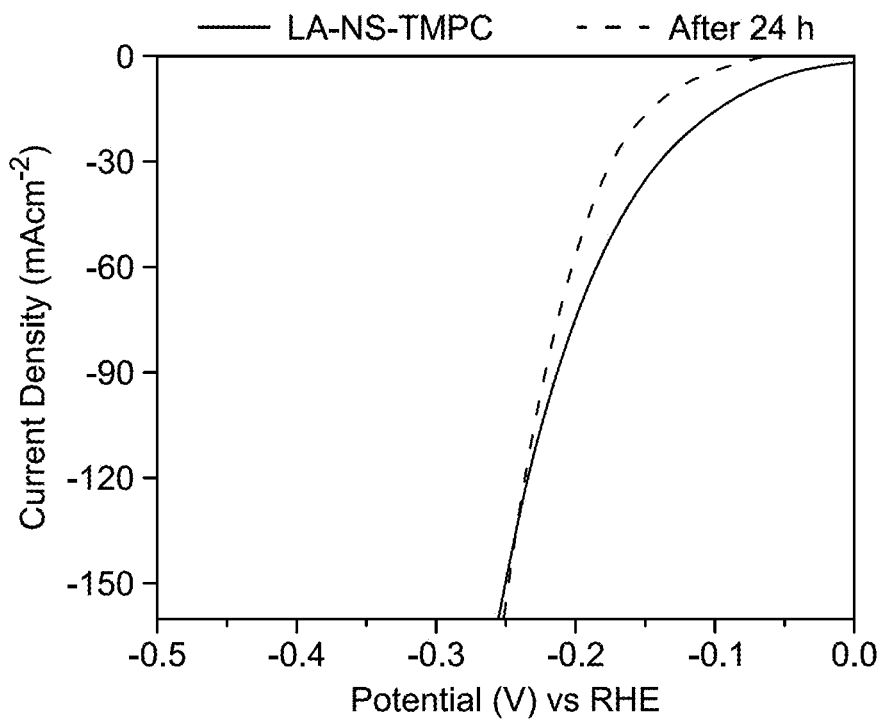
FIG. 7B illustrates the polarization curve of the bimetallic LA-NS-TMPC electrocatalyst before and after stability test, according to certain embodiments.

After the desirable HER performance of LA-NS-TMP, choronopotentiometric (CP) stability profile of the electrocatalyst was measured for practical application of the electrocatalyst. CP stability profile was evaluated using a fixed current density (10 mA cm$^{-2}$) to assess the stability of synthesized electrocatalysts, as shown in FIG. 7A. The LA-NS-TMPC showed a quite stable and linear potential signal during the 48 h CP test, indicating excellent stability for the HER. The durability test was followed by the measurement of polarization curves of the LA-NS-TMPC catalyst that displayed slight shifts in the onset potential, as shown in FIG. 7B, further demonstrating its outstanding durability in a 1.0 M solution of KOH.

The aspects of the present disclosure pertain to the synthesis, structural modification, and application of heteroatom-doped microporous polymer-derived electrocatalysts for hydrogen evolution in alkaline media. The present disclosure further describes the preparation of the microporous polymer including polymerized units of triptycene and phenothiazine, referred to herein as NS-TMP, and a conversion thereof into a nitrogen and sulfur co-doped carbon material, designated LA-NS-TMPC, via a laser-assisted annealing process conducted on a nickel foam substrate. The resulting LA-NS-TMPC electrocatalyst exhibited improved electrochemical performance in comparison to unannealed counterpart, NS-TMP, as demonstrated by reduced overpotentials, lower Tafel slopes, and enhanced long-term electrochemical stability.

Specifically, LA-NS-TMPC achieves an overpotential of approximately 80 mV at a current density of 10 mA cm$^{-2}$, and a Tafel slope of 48 mV dec$^{-1}$, indicating efficient charge transfer kinetics and effective catalysis of the hydrogen evolution reaction. The presence of nitrogen and sulfur heteroatoms, introduced through the polymer precursors and retained post-annealing, is understood to modify the electronic structure of the carbon framework and contribute to the increased density of catalytically active sites. The electrocatalyst further demonstrates consistent performance over a 48-hour duration.

The synthetic route described herein is based on a one-pot polymerization approach followed by a laser-induced transformation, both of which are compatible with scale-up and industrial processing. The use of cost-efficient starting materials, elimination of precious metals, and employment of energy-efficient post-processing techniques such as laser annealing may address prevailing limitations associated with existing electrocatalyst systems. Accordingly, the disclosed electrocatalyst compositions and methods of fabrication provide an alternative for hydrogen production via electrochemical water splitting, and are suitable for incorporation into water electrolysers, fuel cell systems, and other renewable energy conversion and storage applications.

Numerous modifications and variations of the present disclosure are possible in light of the above teachings. It is therefore to be understood that within the scope of the appended claims, the invention may be practiced otherwise than as specifically described herein.

The invention claimed is:

1. An electrocatalyst, comprising
a substrate; and
a microporous polymer disposed on the substrate, wherein the microporous polymer comprises, in polymerized form, a triptycene of Formula (I)

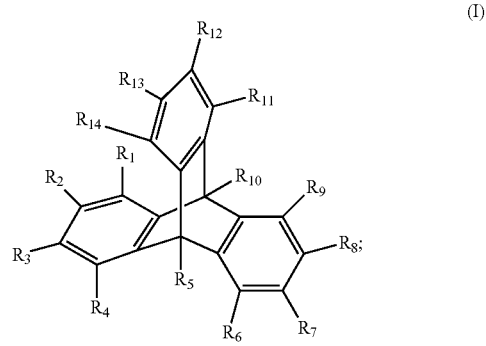

and
a phenothiazine of Formula (II)

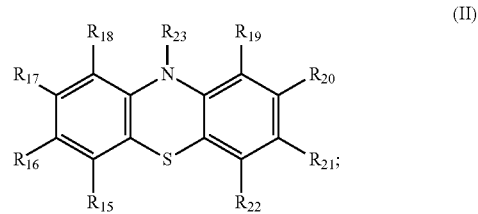

wherein Formula (I), $R_{1-14}$ each individually represent hydrogen, an optionally substituted alkyl, an optionally substituted aryl, or an optionally substituted alkaryl, with at least two representing hydrogen;

wherein Formula (II), $R_{15-23}$ each individually represent hydrogen, an optionally substituted alkyl, an optionally substituted aryl, or an optionally substituted alkaryl, with at least two of $R_{15}$-$R_{22}$ representing hydrogen; and wherein the triptycene of Formula (I) and the phenothiazine of Formula (II) are linked by methylene units.

2. The electrocatalyst of claim 1, wherein the triptycene of Formula (I) is triptycene.

3. The electrocatalyst of claim 1, wherein the phenothiazine of Formula (II) is phenothiazine.

4. The electrocatalyst of claim 1, wherein each triptycene of Formula (I) is connected to from 2 to 6 phenothiazines of Formula (II).

5. The electrocatalyst of claim 1, comprising structural units of Formula (III):

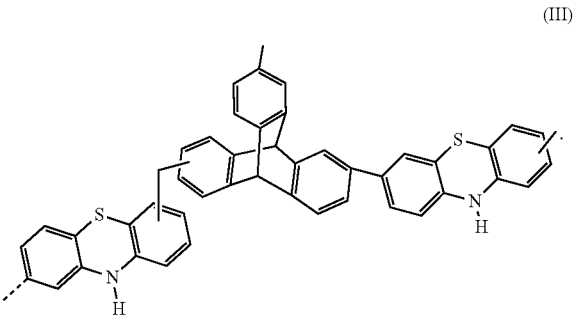

6. The electrocatalyst of claim 1, wherein the microporous polymer is amorphous by PXRD.

7. The electrocatalyst of claim 1, having a mass loading of 1 to 25 mg the microporous polymer per cm² of substrate.

8. The electrocatalyst of claim 1, further comprising carbon nanosheets disposed on the porous polymer, wherein the carbon nanosheets are amorphous by XRD.

9. The electrocatalyst of claim 1, wherein the substrate is nickel foam.

10. A method of forming the electrocatalyst of claim 1, the method comprising
    suspending the microporous polymer in an alcohol having 1 to 5 carbon atoms to form a deposition solution;
    depositing the porous polymer on the substrate by drop-casting the deposition solution to form a coated electrode; and
    drying the coated electrode to form the electrocatalyst.

11. The method of claim 10, further comprising forming the microporous polymer by:
    heating a reaction mixture comprising the triptycene of Formula (I), the phenothiazine of Formula (II), a methylene-containing crosslinking agent, and a Lewis acid catalyst in an organic solvent to 50 to 100° C. to form the microporous polymer.

12. The method of claim 11, wherein the triptycene of Formula (I) is triptycene.

13. The method of claim 11, wherein the phenothiazine of Formula (II) is phenothiazine.

14. The method of claim 11, wherein the methylene-containing crosslinking agent is dimethoxymethane.

15. The method of claim 11, wherein the Lewis acid catalyst is $FeCl_3$.

16. The method of claim 10, further comprising
    prior to the drying, irradiating the coated electrode with a laser having a wavelength of 10.6 µm and a maximum power of 5 to 50 W.

17. A method of electrochemically forming hydrogen gas by a hydrogen evolution reaction, the method comprising:
    contacting the electrocatalyst of claim 1 with an aqueous electrolyte solution comprising a hydroxide base; and
    applying a potential of −0.75 to 0.10 V to the electrocatalyst and a counter electrode immersed in the aqueous electrolyte solution.

18. The method of claim 17, wherein the electrocatalyst has a hydrogen evolution reaction onset potential of −0.25 to −0.01 V relative to the reversible hydrogen electrode.

19. The method of claim 17, wherein
    the electrocatalyst has an overpotential required to generate a current density of 10 mAcm$^{-2}$ ($\eta 10$) of 50 to 150 mV relative to the reversible hydrogen electrode; and
    the electrocatalyst has a Tafel slope of 25 to 150 mV dec$^{-1}$.

20. The method of claim 17, wherein the hydroxide base is 1.0 M KOH.

\* \* \* \* \*